US007538556B2

(12) United States Patent
Nakajima

(10) Patent No.: US 7,538,556 B2
(45) Date of Patent: May 26, 2009

(54) SPOT-TYPE IONIZER EVALUATION METHOD AND SPOT-TYPE IONIZER

(75) Inventor: Tomohide Nakajima, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 193 days.

(21) Appl. No.: 11/635,858

(22) Filed: Dec. 8, 2006

(65) Prior Publication Data

US 2008/0030918 A1 Feb. 7, 2008

(30) Foreign Application Priority Data

Aug. 3, 2006 (JP) ............................ 2006-211827

(51) Int. Cl.
*G01L 21/30* (2006.01)
*H05F 3/00* (2006.01)
*B03C 3/00* (2006.01)

(52) U.S. Cl. ........................... 324/460; 361/212; 96/15

(58) Field of Classification Search .................. 324/460
See application file for complete search history.

(56) References Cited

U.S. PATENT DOCUMENTS 3,761,708 A * 9/1973 Roepke et al. .............. 250/282
5,055,963 A * 10/1991 Partridge .................... 361/231
6,785,114 B2 8/2004 Gorczyca et al.
2004/0136872 A1* 7/2004 Miller et al. .................. 422/83
2005/0286201 A1* 12/2005 Jacobs et al. ................ 361/220

FOREIGN PATENT DOCUMENTS

JP 2000-100596 4/2000
JP 2003-028472 1/2003

* cited by examiner

*Primary Examiner*—Timothy J Dole
*Assistant Examiner*—Jeff Natalini
(74) *Attorney, Agent, or Firm*—Greer, Burns & Crain, Ltd.

(57) ABSTRACT

A spot-type DC ionizer placed above a measurement plate of a charge plate monitoring device including a grid using a metal net attached to a nozzle opening. Compressed air is set at a value, and a use distance between the measurement plate and the nozzle opening is set. The ionizer measures an ion balance and variation for comparison with threshold values, and if the ion balance and variation are equal to or lower than respective threshold values, an accepted determination is made. Otherwise, a failed determination is made and a static elimination time is measured. If the static elimination time is longer than a threshold time, the static elimination time is measured while air pressure is increased, and an air pressure with the static elimination time equal to or shorter than the threshold time is determined as an optimal air pressure with the set use distance.

17 Claims, 19 Drawing Sheets

FIG. 3

46-1

| GRID NUMBER | WIRE DIAMETER Φ | MESH NUMBER # | 1 MESH SIZE A (mm) | MESH OPENING M (mm) | SPACE RATIO SR (%) |
|---|---|---|---|---|---|
| G1 | 0.065 | 150 | 0.17 | 0.10 | 38.0 |
| G2 | 0.100 | 100 | 0.25 | 0.15 | 36.8 |
| G3 | 0.050 | 100 | 0.25 | 0.20 | 64.5 |
| G4 | 0.290 | 32 | 0.79 | 0.50 | 40.3 |
| G5 | 0.600 | 16 | 1.59 | 0.99 | 38.7 |
| G6 | 0.570 | 14 | 1.81 | 1.24 | 47.0 |
| G7 | 0.340 | 16 | 1.59 | 1.25 | 61.8 |
| G8 | 0.500 | 10 | 2.54 | 2.04 | 64.5 |
| G9 | 1.200 | 06 | 4.23 | 3.03 | 51.3 |
| G10 | 1.000 | 05 | 5.08 | 4.08 | 64.5 |
| G11 | 1.400 | 04 | 6.35 | 4.95 | 60.8 |

FIG. 5

46-2

| GRID NUMBER | WIRE DIAMETER Φ | MESH NUMBER # | 1 MESH SIZE A (mm) | MESH OPENING M (mm) | SPACE RATIO SR (%) |
|---|---|---|---|---|---|
| G2 | 0.10 | 100 | 0.25 | 0.15 | 36.8 |
| G1 | 0.065 | 150 | 0.17 | 0.10 | 38.0 |
| G5 | 0.60 | 16 | 1.59 | 0.99 | 38.7 |
| G4 | 0.29 | 32 | 0.79 | 0.50 | 40.3 |
| G6 | 0.57 | 14 | 1.81 | 1.24 | 47.0 |
| G9 | 1.20 | 6 | 4.23 | 3.03 | 51.3 |
| G11 | 1.40 | 4 | 6.35 | 4.95 | 60.8 |
| G7 | 0.34 | 16 | 1.59 | 1.25 | 61.8 |
| G3 | 0.05 | 100 | 0.25 | 0.20 | 64.5 |
| G8 | 0.50 | 10 | 2.54 | 2.04 | 64.5 |
| G10 | 1.00 | 5 | 5.08 | 4.08 | 64.5 |

FIG. 8

48

| USE DISTANCE L (CM) | AIR PRESSURE P (MPa) | GRID NUMBER | | | | | | | | | | |
|---|---|---|---|---|---|---|---|---|---|---|---|---|
| | | G1 | G2 | G3 | G4 | G5 | G6 | G7 | G8 | G9 | G10 | G11 |
| 5.0 | 0.1 | △ | ○ | ○ | ○ | ○ | ○ | ○ | ○ | △ | × | × |
| | 0.2 | ○ | ○ | ○ | ○ | ○ | ○ | ○ | ○ | △ | × | × |
| | 0.3 | ○ | ○ | ○ | ○ | ○ | ○ | ○ | ○ | △ | × | × |
| | 0.4 | ○ | ○ | ○ | ○ | ○ | ○ | ○ | ○ | △ | × | × |
| 7.5 | 0.1 | △ | △ | ○ | ○ | ○ | ○ | ○ | ○ | △ | × | × |
| | 0.2 | △ | ○ | ○ | ○ | ○ | ○ | ○ | ○ | △ | × | × |
| | 0.3 | ○ | ○ | ○ | ○ | ○ | ○ | ○ | ○ | △ | × | × |
| | 0.4 | ○ | ○ | ○ | ○ | ○ | ○ | ○ | ○ | △ | × | × |
| 10.0 | 0.1 | × | △ | △ | ○ | ○ | ○ | ○ | ○ | △ | × | × |
| | 0.2 | △ | △ | ○ | ○ | ○ | ○ | ○ | ○ | △ | × | × |
| | 0.3 | ○ | ○ | ○ | ○ | ○ | ○ | ○ | ○ | △ | × | × |
| | 0.4 | ○ | ○ | ○ | ○ | ○ | ○ | ○ | ○ | △ | × | × |

○ : ACCEPTED PRODUCT △ : PROVISIONALLY-ACCEPTED PRODUCT × : FAILED PRODUCT

FIG. 9

50

(USE DISTANCE L=5.0cm, AIR PRESSURE P=0.1Mpa)

| CASE NUMBER | GRID MESH OPENING M (mm) | MATERIAL | ION BALANCE VARIATION Vp-p | | DISCHARGING TIME (SECOND) | |
|---|---|---|---|---|---|---|
| | | | WITHOUT GROUND CONNECTION | WITH GROUND CONNECTION | WITHOUT GROUND CONNECTION | WITH GROUND CONNECTION |
| A | 0.15 | Cu | 0.5 | 0.5 | 1.7 | 1.7 |
| B | 0.15 | Ni | 0.5 | 0.5 | 1.7 | 1.5 |
| C | 0.15 | SUS | 0.5 | 0.0 | 2.5 | 2.1 |
| D | 0.20 | Ni | 1.0 | 1.0 | 1.5 | 1.5 |
| E | 0.45 | SUS | 0.5 | 0.0 | 2.3 | 2.3 |
| F | 0.50 | SUS | 0.5 | 0.0 | 1.9 | 1.9 |
| G | 1.00 | SUS | 1.5 | 1.0 | 1.7 | 1.7 |
| H | 2.00 | SUS | 3.0 | 2.0 | 1.6 | 1.5 |
| I | 3.00 | SUS | 3.0 | 1.0 | 1.5 | 1.5 |
| J | 4.00 | SUS | 3.0 | 2.0 | 1.5 | 1.5 |
| K | 5.00 | SUS | 3.0 | 2.0 | 1.5 | 1.5 |

FIG. 13A 84-1

(USE DISTANCE L=5.0cm, AIR PRESSURE P=0.1MPa, MATERIAL SUS, GROUND CONNECTION)

| CASE NUMBER | GRID MESH OPENING M (mm) | ION BALANCE V | ION BALANCE VARIATION Vp-p | STATIC ELIMINATION TIME (SECOND) |
|---|---|---|---|---|
| A | WITHOUT GRID | 17 | 0 | INFINITE |
| B | 0.15 | 4 | 0 | 12.6 |
| C | 0.50 | 2 | 0 | 9.8 |
| D | 1.00 | 3 | 0 | 10.6 |
| E | 2.00 | 2 | 0 | 9.6 |
| F | 3.00 | 2 | 0 | 9.8 |
| G | 4.00 | 0 | 0 | 8.5 |
| H | 5.00 | 0 | 0 | 9.0 |

FIG. 13B 84-2

(USE DISTANCE L=5.0cm, AIR PRESSURE P=0.2MPa, MATERIAL SUS, GROUND CONNECTION)

| CASE NUMBER | GRID MESH OPENING M (mm) | ION BALANCE V | ION BALANCE VARIATION Vp-p | STATIC ELIMINATION TIME (SECOND) |
|---|---|---|---|---|
| A | WITHOUT GRID | 25 | 0 | INFINITE |
| B | 0.15 | 3 | 0 | 4.4 |
| C | 0.50 | 1 | 0 | 4.3 |
| D | 1.00 | 3 | 0 | 4.4 |
| E | 2.00 | 2 | 0 | 3.8 |
| F | 3.00 | 3 | 0 | 4.4 |
| G | 4.00 | 2 | 0 | 4.0 |
| H | 5.00 | 2 | 0 | 3.5 |

FIG. 13C 84-3

(USE DISTANCE L=5.0cm, AIR PRESSURE P=0.3MPa, MATERIAL SUS, GROUND CONNECTION)

| CASE NUMBER | GRID MESH OPENING M (mm) | ION BALANCE V | ION BALANCE VARIATION Vp-p | STATIC ELIMINATION TIME (SECOND) |
|---|---|---|---|---|
| A | WITHOUT GRID | 22 | 0 | INFINITE |
| B | 0.15 | 2 | 0 | 3.1 |
| C | 0.50 | 2 | 0 | 3.0 |
| D | 1.00 | 2 | 0 | 2.7 |
| E | 2.00 | 1 | 0 | 2.9 |
| F | 3.00 | 1 | 0 | 2.7 |
| G | 4.00 | 3 | 0 | 3.0 |
| H | 5.00 | 1 | 0 | 2.9 |

FIG. 13D 84-4

(USE DISTANCE L=5.0cm, AIR PRESSURE P=0.4MPa, MATERIAL SUS, GROUND CONNECTION)

| CASE NUMBER | GRID MESH OPENING M (mm) | ION BALANCE V | ION BALANCE VARIATION Vp-p | STATIC ELIMINATION TIME (SECOND) |
|---|---|---|---|---|
| A | WITHOUT GRID | 43 | 0~12 | INFINITE |
| B | 0.15 | 2 | 0 | 2.2 |
| C | 0.50 | 0 | 0 | 2.3 |
| D | 1.00 | 2 | 0 | 2.3 |
| E | 2.00 | 0 | 0 | 1.9 |
| F | 3.00 | 2 | 0 | 1.9 |
| G | 4.00 | 0 | 0 | 2.3 |
| H | 5.00 | 2 | 0 | 2.0 |

FIG. 13E 84-5

(USE DISTANCE L=5.0cm, AIR PRESSURE P=0.4MPa, MATERIAL SUS, WITHOUT GROUND CONNECTION)

| CASE NUMBER | GRID MESH OPENING M (mm) | ION BALANCE V | ION BALANCE VARIATION Vp-p | STATIC ELIMINATION TIME (SECOND) |
|---|---|---|---|---|
| A | WITHOUT GRID | 43 | 0~12 | INFINITE |
| B | 0.15 | 1 | 0 | 2.5 |
| C | 0.50 | 2 | 0 | 2.2 |
| D | 1.00 | 1 | 0 | 2.2 |
| E | 2.00 | 2 | 0 | 2.2 |
| F | 3.00 | 0 | 0 | 2.1 |
| G | 4.00 | 0 | 0 | 2.1 |
| H | 5.00 | 0 | 0 | 2.0 |

SPOT-TYPE IONIZER EVALUATION METHOD AND SPOT-TYPE IONIZER

This application is a priority based on prior application No.JP 2006-211827, filed Aug. 3, 2006, in Japan.

BACKGROUND OF THE INVENTION

1. Field of the Invention

The present invention relates to a method of evaluating a spot-type ionizer in which a driving voltage is applied to discharge needles and ion air containing plus ions and minus ions generated through corona discharge is blown in a spot manner from a nozzle opening onto a target to neutralize static electricity and, particularly, to a spot-type ionizer evaluation method and spot-type ionizer in which, for an ion balance and a decrease in ion balance variation, a grid is attached to the nozzle opening to generate an optimum use condition.

2. Description of the Related Arts

Conventionally, in a hard disk drive manufacturing process, a semiconductor manufacturing process, a liquid-crystal manufacturing process, and the like, an ionizer is used in order to prevent an electrostatic hazard in a clean room. The ionizer functioning as a static eliminator performs static elimination by neutralizing static electricity, which would cause a trouble, such as product destruction or an erroneous operation of equipment. Depending on the method of generating ions, ionizers are divided into those of AC scheme and those DC scheme. An AC ionizer applies an alternate-current voltage to a discharge needle for corona discharge to alternately generate plus ions and minus ions. Also, a DC ionizer applies a direct-current voltage to a pair of discharge needles for corona discharge to generate plus ions from a plus-side discharge needle and simultaneously minus ions from a minus-side discharge needle. Also, ionizers include those of a distribution type for distributing the generated plus ions and minus ions to a wider area (JP2000-100596 and JP2003-28472) and those of a spot type for blowing the generated plus ions and minus ions onto the target in a spot manner with compressed air. In a hard disk drive manufacturing process, a semiconductor manufacturing process, a liquid-crystal manufacturing process, and the like, fine device targets are targets for static elimination. Therefore, a spot-type ionizer with a small ion balance and a shorter static elimination time are used. As indicators for evaluating the performance of the ionizer, an ion balance and a static elimination time have been known, which are measured with the use of a charge-plate monitoring device. The charge-plate monitoring device is configured of a measurement plate and measuring unit body, in which the potential of the measurement plate is measured by the measuring unit body and can be on digital display. Here, the ion balance represents a value obtained by, after connecting the measurement plate to the ground and setting an indication of a plate voltage to 0 V, blowing ion air of the ionizer onto the measurement plate and measuring a plate potential. At this time, if the plus ions and the minus ions generated by the ionizer are equal to each other, the ion balance (plate voltage) is stable near 0 V. That is, if the ion balance is stable near 0 V, it can be said that the performance of the ionizer is high. Also, the static elimination time is a time taken from the time when the voltage of the measurement plate is increased to, for example, 1000 V, to the time when ion air from the ionizer is applied onto the measurement plate until the voltage of the measurement plate is attenuated to, for example, 100 V. Similarly, it can be said that, as the static elimination time is shorter, the performance of the ionizer is higher. Generally speaking, in a distribution-type ionizer for wide-area static elimination, the ion balance does not pose much problems because the target has a high withstanding voltage. However, in a spot-type ionizer for use in a hard disk drive manufacturing process, a semiconductor manufacturing process, a liquid-crystal manufacturing process, and the like, the ion balance has to be decreased as much as possible because the target has a low withstanding voltage. In particular, with the increase in integration and response speed of semiconductors in recent years, the withstanding voltage of electronic devices with respect to static electricity is decreasing. In a semiconductor manufacturing process, an ion balance of ±5 to ±10 V is required. Furthermore, in a hard disk manufacturing process, a further lower ion balance equal to or lower than ±5 V or ±3 V or further equal to or lower than ±1 V is required. Here, in some conventional distribution-type ionizers disclosed in the references 1 and 2, a grid using a metal net is placed at an entrance or exit of the ion air. However, a distance from the exit of the ion air to the target is often equal to or longer than 1 meter, which is considerably distant. With such a distance, due to an ionic bond with ions exiting in the air, the ion balance is stabilized. Therefore, a change in ion balance cannot particularly been observed between the case where a grid is placed and the case where no grid is placed.

However, in the conventional spot-type DC ionizer, at the charge-plate monitoring device, after zero-point adjustment in which the measurement plate is connected to the ground and an indication of a plate voltage is set to 0 V, ion air of the ionizer is blown onto the measurement plate, and a plate potential is measured, thereby checking an ion balance at 0 V from the display value of a digital voltmeter. In such a case where, after the ion balance is checked, the target device is processed while the ion air is blown on to the target device, even an ion balance is achieved, an electrostatic breakdown of the target device occurs at some frequencies, posing a problem of not always ensuring the performance of the ionizer. Moreover, in a spot-type AC ionizer, with a known normal use distance on the order of 5 to 10 cm, the ion balance is increased to be equal to or larger than 20 V. To decrease the ion balance within ±1 V, the ionizer has to be set with a use distance equal to or longer than 30 cm. However, if the use distance of the AC ionizer is as much as 30 cm, the ion air is diffused, the ionizer ceases to function as a spot-type, the static elimination time is significantly increased to exceed use limitations. To get around this, the air pressure supplied to the AC ionizer is significantly increased to, for example, 1.0 MPa to ensure a sufficiently short static elimination time. However, if the air pressure is increased in such a manner, a large noise occurs due to compressed air jetted from a nozzle opening of the AC ionizer, thereby significantly increasing a noise level in a working environment.

SUMMARY OF THE INVENTION

According to the present invention to provide a spot-type ionizer evaluation method and a spot-type ionizer in which, in addition to an ion balance, an ion balance variation is newly determined, thereby generating a relation between an optimum use distance and an air pressure as a use condition.

First, the inventor of the present invention newly introduces, as a parameter for evaluating a spot-type ionizer, a parameter of an ion balance variation, in addition to the conventional ion balance and static elimination time.

Due to information from a person in charge of a work site indicating that the ion balance is slightly varied due to the strength of air velocity or a turbulent flow of the air blown from the air outlet, the present inventor actually connected a recorder to a charge-plate monitoring device to successively record and monitor variations in ion balance for a spot-type DC ionizer. As a result, it was found that, even though the ion balance is achieved with a 0 V display of a digital voltmeter of the monitoring device body, a recorded waveform on the recorder is significantly varied centering at 0 V and within a range of a peak-to-peak voltage Vp-p of approximately 6 V.

Here, the peak-to-peak voltage is within a range of approximately 9 V in the actual recorder's recorded waveform, but since Vp-p=approximately 3 V is observed in the recorded waveform at the time of zero-point adjustment, and therefore a calibrated value obtained by subtraction of this amount is Vp-p=approximately 6 V.

This phenomenon represents an ion balance variation. Conventionally, the ion balance is determined based on the indication of the digital voltmeter of the apparatus body, and therefore the ion balance variation is not recognized.

As such, the ion balance variation is as much as approximately 6 V in terms of Vp-p even with an ion balance of 0 V. Therefore, a requirement condition in the hard disk drive manufacturing process in the future that requires an offset within ±1.0 V as an ion balance is not satisfied, thereby causing an electrostatic breakdown of the target device occurs due to the ion balance variation. To address this problem, a measure is taken such that the use distance of the ionizer is increased to increase an air pressure, without knowing the cause. This is not a substantial solution.

As described above, since it was able to be found that the electrostatic breakdown of the target device is caused due to ion balance variation, the present inventor has repeated various types of trial and error to reduce and eliminate the ion balance variation while measuring it. In the course of this, when a grid made of a metal net for use in diffusion-type ionizer disclosed in Patent Documents 1 and 2 was used, it was confirmed that the ion balance variation can be almost eliminated for a DC ionizer.

Also, in an AC ionizer, it was confirmed that the ion balance variation is approximately zero irrespectively of the presence or absence of a grid. Furthermore, it was confirmed that, with the attachment of the grid, the ion balance can be reduced within ±1 V without much increasing the air pressure with a use distance of 5 cm to 10 cm.

The present invention has been ardently devised based on the above-described new findings by the inventor, and to provide a spot-type ionizer evaluation method and, furthermore, a spot-type ionizer itself in which, assuming that a grid of a metal net is used, in addition to an ion balance and a static elimination time, an ion balance variation is newly adopted as an evaluation parameter, and a relation between an optimum use distance and an air pressure is generated as a use condition.

(Ionizer Evaluation Method)

The present invention provides a spot-type ionizer evaluation method. The present invention is directed to a method of evaluating a spot-type ionizer in which a driving voltage is applied to a discharge needle for corona discharge to generate plus ions and minus ions and, with air externally supplied, ion air containing the plus ions and the minus ions generated from the discharge needle is blown in a spot manner from a nozzle opening onto a target to neutralize static electricity, the method including:

placing the spot-type ionizer above and apart from a measurement plate of a charge-plate monitoring device;

attaching a grid using a metal net to the nozzle opening of the ionizer;

setting an air pressure of the compressed air at a predetermined value and setting a use distance between the measurement plate and the nozzle opening at a predetermined distance;

operating the spot ionizer to measure by the charge-plate monitoring device an ion balance and an ion balance variation for comparison with respective threshold values, and if the ion balance and the ion balance variation are equal to or lower than the respective threshold values, making a determination as accepted, and if the ion balance and the ion balance variation are larger than the respective threshold values, making a determination as failed;

if the determination is made as accepted regarding the ion balance and the ion balance variation, with the measurement plate being charged with a predetermined start voltage by the charge-plate monitoring device, measuring a static elimination time until the predetermined start voltage is decreased to a predetermined static-elimination voltage by an operation of the ionizer;

comparing the static elimination time with a predetermined threshold time, if the static elimination time is longer than the threshold time, measuring the static elimination time while increasing the air pressure, and determining an air pressure with the static elimination time being equal to or shorter than the threshold time as an optimal air pressure with the set use distance; and generating an acceptance result for the grid with a combination of the set use distance and the optimal air pressure as a use condition.

Here, the spot-type ionizer is a DC ionizer in which a direct-current voltage is applied to a pair of discharge needles for corona discharge, plus ions are generated from a plus-side discharge needle and simultaneously minus ions are generated from a minus-side discharge needle and, with a compressed air externally supplied, the ion air containing the plus ions and the minus ions generated from the discharge needles is blown from the nozzle opening onto the target to neutralize static electricity.

Also, the spot-type ionizer is an AC ionizer in which an alternate-current voltage is applied to the discharge needles for corona discharge, plus and minus ions are alternately generated from a plus-side discharge needle and, with a compressed air externally supplied, the ion air containing the plus ions and the minus ions generated from the discharge needle is blown from the nozzle opening onto the target to neutralize static electricity.

As the grid to be attached to the spot-type ionizer, a plurality of grids with a mesh opening of meshes within a range of 0.1 mm to 1.27 mm inclusive are prepared, and the evaluation process is repeated for each grid to generate the acceptance result with the combination of the set use distance and the optimal air pressure as the use condition.

As the grid to be attached to the spot-type ionizer, a plurality of grids with a space ratio SR of meshes within a range of 35% to 65% inclusive are prepared, and the evaluation process is repeated for each grid to generate the acceptance result with the combination of the set use distance and the optimal air pressure as the use condition.

The grid is a metal net made of copper Cu, copper plating, nickel Ni, nickel plating, or stainless steel SUS.

In the spot-type ionizer, the use distance of the spot-type ionizer is set within a range of 5 cm to 10 cm inclusive, and a determination is made as accepted if the ion balance is equal to or lower than ±1 V and the ion balance variation is equal to or lower than 2.0 Vp-p.

The static elimination time is measured while the air pressure of the compressed air supplied to the spot-type ionizer is changed within a range of 0.1 MPa to 0.4 MPa inclusive to determine the optimal air pressure.

The evaluation process is performed without a ground connection of the grid to generate the acceptance result for the grid with the combination of the set use distance and the optimal air pressure as the use condition. Also, the evaluation process may be performed with a ground connection of the grid to generate the acceptance result for the grid with the combination of the set use distance and the optimal air pressure as the use condition.

The ion balance variation represents a value obtained by making a ground connection of the measurement plate to measure in advance a zero-adjustment value of the ion balance variation, and performing calibration by subtracting the zero-adjustment value from the ion balance variation measured with the spot-type ionizer being operated.

The ion balance variation is measured from a recorded waveform of a potential of the measurement plate by a recorder connected to the charge-plate monitoring device.

Measuring the static elimination time is performed by measuring, with the measurement plate being charged with a predetermined start voltage of 1000 V by the charge-plate monitoring device, a time until the predetermined start voltage is decreased to a predetermined static-elimination voltage of 5 V by an operation of the ionizer.

(Spot-Type Ionizer)

The present invention provides a spot-type ionizer. The present invention is directed to a spot-type ionizer in which a driving voltage is applied to discharge needles for corona discharge to generate plus ions and minus ions and, with air externally supplied, ion air containing the plus ions and the minus ions generated from the discharge needles is blown in a spot manner from a nozzle opening onto a target to neutralize static electricity, wherein a grid using a metal net is attached to the nozzle opening, and the grid has a space ratio SR of meshes within a range of 35% to 65% inclusive.

Here, the spot-type ionizer is a DC ionizer in which plus ions and minus ions are simultaneously generated through corona discharge by application of a direct-current voltage or an AC ionizer in which plus ions and minus ions are alternately generated through corona discharge by application of an alternate-current voltage.

The grid has, for example, a mesh opening of meshes within a range of 0.1 mm to 1.27 mm inclusive. Also, for the grid, a metal net made of copper Cu, copper plating, nickel Ni, nickel plating, or stainless steel SUS is used.

The spot-type ionizer has, as use conditions, a use distance within a range of 5 cm to 10 cm inclusive, an ion balance equal to or lower than ±1 V, an ion balance variation equal to or lower than 2.0 Vp-p, and the air pressure being within a range of 0.1 MPa to 0.4 MPa inclusive. Also, as required, a ground connection of the grid may be made.

According to the spot-type ionizer evaluation method of the present invention, a plurality of types of grids with different mesh openings of meshes, space ratios, and materials are prepared, and, in addition to the conventional ion balance and static elimination time, an ion balance variation is newly added to evaluation parameters. For a grid, an acceptance result with a set distance of, for example, 5 to 10 cm and an optimum air pressure being taken as use conditions. With this, it is ensured that the ion balance corresponding to the electrostatic withstanding voltage of the target device is, for example, equal to or lower than ±1 V and the ion balance variation is such that, for example, Vp-p=2.0 or lower. Thus, an electrostatic breakdown of the target device by the spot-type ionizer is reliably prevented, the yield in a hard disk drive manufacturing process or the like is improved, and high efficiency in productivity and reduction in cost can be achieved.

Also, in a spot-type AC ionizer, only with the attachment of a grid, the ion balance can be reduced within ±1 V, which is required in a hard disk drive manufacturing process, from a conventional voltage over 20 V, even with the required use distance of 5 to 10 cm. As a result, for a spot-type AC ionizer, the conventional problem of a large noise due to a distance on the order of 30 cm and the increase in air pressure can be completely solved, thereby significantly improving the manufacturing process environment using an ionizer.

Furthermore, the present invention provides a spot-type ionizer itself with a grid using a metal net being attached to a nozzle opening that achieves an accepted result from the evaluation method of the present invention. With this, for an electronics device with a low electrostatic withstanding voltage, for example, within 1 V, static elimination can be reliably performed without causing an electrostatic breakdown. The above and other objects, features, and advantages of the present invention will become more apparent from the following detailed description with reference to the drawings.

BRIEF DESCRIPTION OF THE DRAWINGS

FIG. 3 is a drawing for describing a list of grids sorted based on mesh opening for evaluation in the present invention;

FIG. 5 is a drawing for describing a list of grids sorted based on a space ratio for evaluation in the present invention;

FIG. 8 is a drawing for describing an evaluation result list when a grid is attached to the spot-type DC ionizer;

FIG. 9 is a drawing for describing a measurement result list when a grid is attached to the spot-type DC ionizer;

FIGS. 13A to 13C are drawings for describing measurement result lists when a grid is attached to the spot-type AC ionizer; and FIGS. 13D and 13E are drawings for describing measurement result lists continued from FIG. 13A to 13C.

DETAILED DESCRIPTION OF THE PREFERRED EMBODIMENTS

Figure 1:
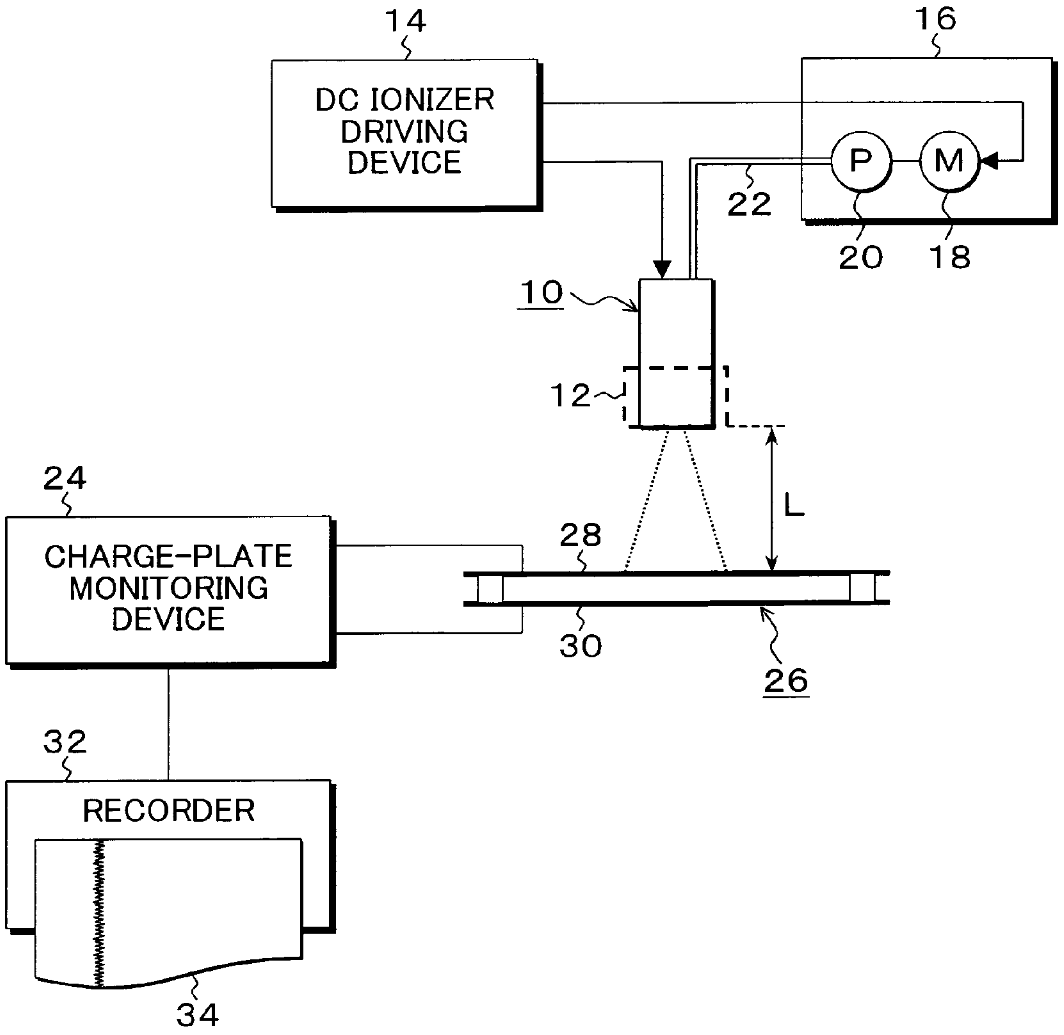
FIG. 1 is a drawing for describing the system configuration of spot-type DC ionizer evaluation process according to the present invention.

FIG. 1 is a drawing for describing the system configuration in which a spot-type DC ionizer evaluation process according to the present invention is performed. In FIG. 1, as an ionizer in the present embodiment, a spot-type DC ionizer 10 is used. To the spot-type DC ionizer 10, a DC ionizer driving device 14 is connected, and also an air-pressure supply device 16 that supplies a compressed air via an air tube 22 is connected. The air-pressure supply device 16 is provided with a motor 18 and a pump 20, supplying an air pressure adjustable within a range of, for example 0.1 MPa to 0.4 MPa. Here, as the air-pressure supply device 16, instead of using a dedicated device, air-pressure supply equipment, such as an air supply tube, in use in a manufacturing facility, such as a clean room, can be used. As the spot-type DC ionizer 10 and the DC ionizer driving device 14 for use in the present embodiment, "ND-503TL, DC & spot type" manufactured by Kasuga Electric Works Ltd. is used, for example. To the spot-type DC ionizer 10 to be evaluated in the present embodiment, a grid 12 using a metal net is attached to a nozzle opening from which ion air is blown. The spot-type DC ionizer 10 with the grid 12 attached thereto is evaluated by using a charge plate 26 having connected thereto a charge-plate monitoring device 24 as a device body. The charge plate 26 is configured of a measurement plate 28 and a ground plate 30. The measurement plate 28 and the ground plate 30 each have a thin rectangular shape with one side of, for example, 15 cm, and are separated a distance on the order of, for example, 15 mm, apart from each other and placed in parallel with an insulating material. With this configuration, the charge plate 26 will have a capacitance of approximately 20 pF. The charge-plate monitoring device 24 includes two functions as measurement operation modes:

(1) ion balance measuring mode, and (2) static elimination time measuring mode.

In the ion balance measuring mode, after zero-point adjustment in which the measurement plate 28 is once connected to the ground to set the voltage of the plate at 0 V, the spot-type DC ionizer 10 is operated to blow ion air onto the measurement plate 28, the plate potential at that time is measured, and then the measured voltage is displayed on a digital voltmeter (not shown) provided to the charge-plate monitoring device 24. Also, the charge-plate monitoring device 24 includes an analog output terminal for outputting to the outside the measured voltage of the measurement plate 28 measured in the ion balance measuring mode. In the present embodiment, a recorder 32 is connected to the analog output terminal of the charge-plate monitoring device 24 so that the measured voltage of the measurement plate 28 in an ion balance operation mode can be recorded on a recording paper sheet 34 of the recorder 32 through, for example, pen recording. As a matter of course, other than pen recording on a recording paper sheet 34, the recorder 32 may perform a display output on a liquid-crystal monitor displaying analog waveform changes of the measured voltage. As the charge-plate monitoring device 24 including the charge plate 26 for use in the evaluation process according to the present embodiment, "700A" manufactured by Hugle Electronics Inc. is used, for example.

Figure 2A:
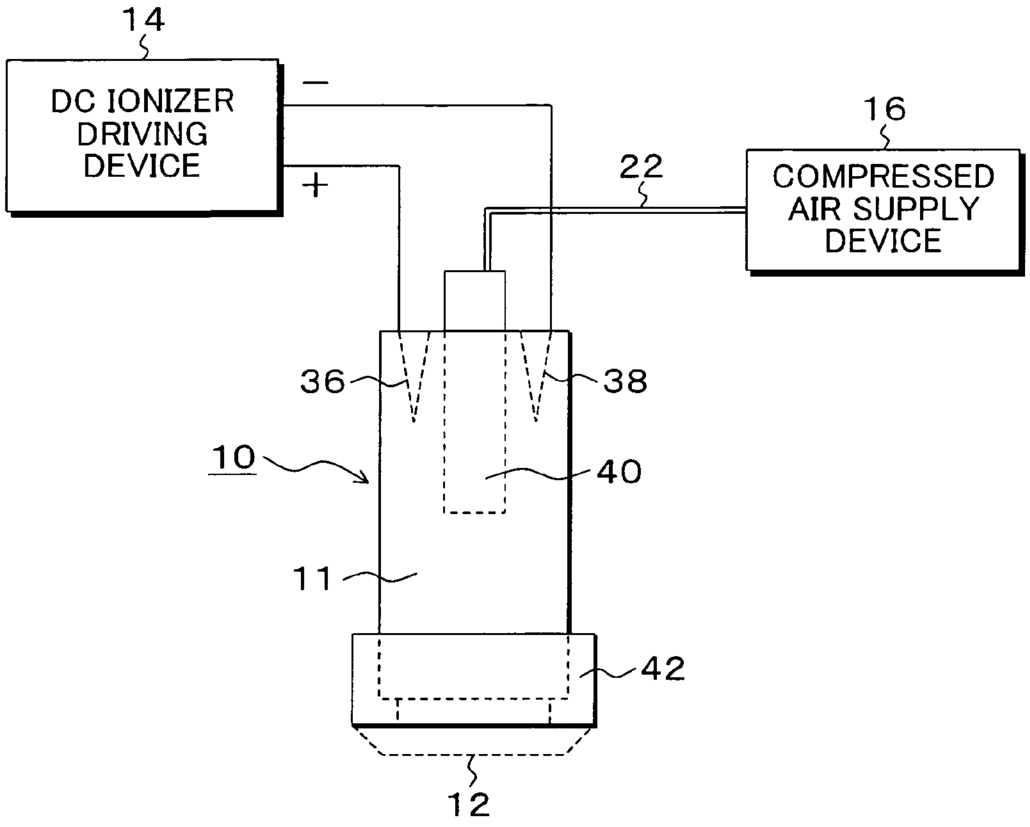
FIGS. 2A and 2B are descriptive drawings that specifically depicts a spot-type DC ionizer of FIG. 1.
Figure 2B:
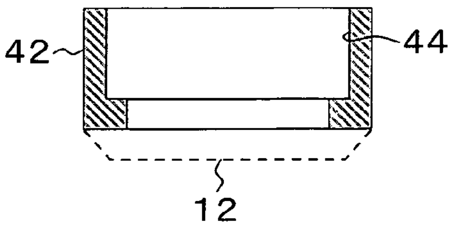

FIGS. 2A and 2B are descriptive drawings that specifically depicts the spot-type DC ionizer 10 of FIG. 1. In FIG. 2A, the spot-type DC ionizer 10 is a cylindrical member with an opening downward. In an upper portion of an ionizer body 11, a plus discharge needle 36 and a minus discharge needle 38 are placed, and placed therebetween an air outlet tube 40 that blows compressed air supplied from the air-pressure supply device 16 via an air tube 22. Furthermore, to a nozzle opening portion at the tip of the ionizer body 11, a grid adaptor 42 is attached including a grid 12. The grid adaptor 42 includes a insertion hole 44 as specifically depicted in FIG. 2B, is attachable to and detachable from the nozzle opening portion of the ionizer body 11 with the insertion hole 44, and has the grid 12 using a metal net placed so that the tip side of the insertion hole 44 is closed. In the spot-type DC ionizer 10 of FIG. 2A, a direct-current high voltage is applied from the DC ionizer driving device 14 to the plus discharge needle 36 and the minus discharge needle 38 in the ionizer body 11 for corona discharge, thereby generating plus ions from the plus discharge needle 36 and, simultaneously, minus ions from the minus discharge needle 38. Thus generated basically the same number of plus and minus ions are assisted by air blown from the air outlet tube 40. Via the grid 12, ion air is blown onto the charge plate 26 placed so as to be separated apart by a use distance L as shown in FIG. 1.

FIG. 3 is a drawing for describing a list of grids 12 to be attached to the spot-type DC ionizer 10 according to the present embodiment. In FIG. 3, a grid list 46-1 takes eleven types with grid numbers G1 to G11 as an example, and each grid includes a wire diameter ϕ, a mesh number #, one mesh size A, mesh opening M, and a space ratio SR, shown as parameters for specifying the grid.

Figure 4:
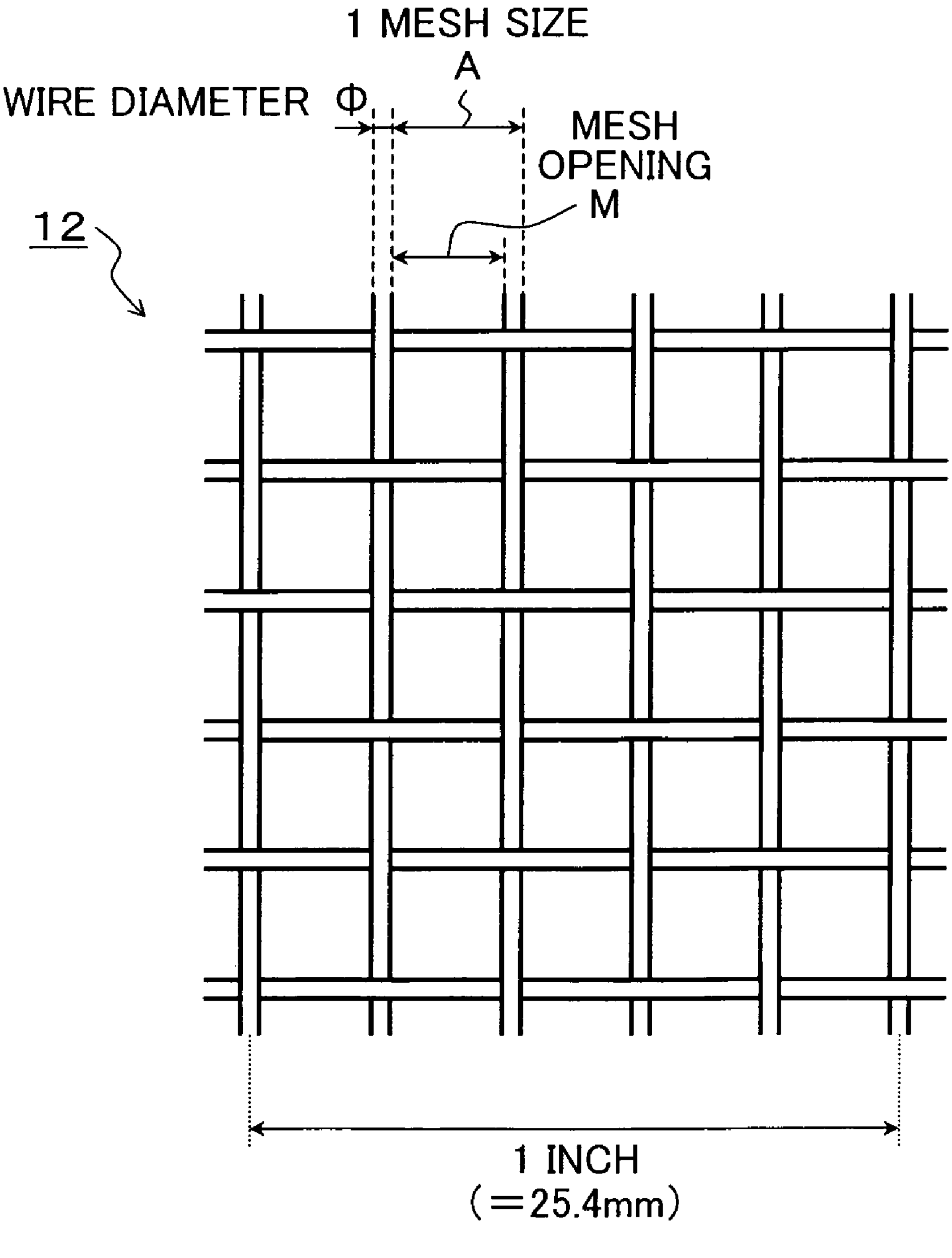
FIG. 4 is a drawing for describing enlarged meshes of a grid.

FIG. 4 is drawing for describing the wire diameter ϕ, one mesh size A, the mesh opening M, and the space ratio SR in the grid list 46-1 of FIG. 3. The grid 12 of FIG. 3 takes a mesh (JIS Z8801) as an example, in which vertical and horizontal wires having the wire diameter ϕ each alternately cross with a predetermined space being kept therebetween. For a rectangular area surround by vertical and horizontal line, a length obtained by subtracting the wire diameter ϕ from a space defined by external potions of two wires represents the one mesh size A, whilst a space obtained by excluding the wire diameter ϕ on both sides represents the mesh opening M. For such a grid 12, the mesh number #, the mesh opening M, and the space ratio SR of FIG. 3 are given by the following equations.

$$\text{mesh number } \# = \frac{\text{the number of mesh openings } N}{25.4} \quad \text{[Equation 1]}$$

$$\text{mesh opening } M = \frac{25.4}{\#} - \phi$$

$$\text{space ratio } SR = \left(\frac{M}{M+\phi}\right)^2 \times 100$$

In the grid list 46-1 of FIG. 3, the grids are sorted in the ascending order of the mesh opening M and are provided with grid numbers G1 to G11.

FIG. 5 depicts a grid list 46-2 in which the grids with the grid numbers G1 to G11 identical to those in FIG. 3 are arranged and sorted based on the ascending order of the space ratio SR.

Figure 6:
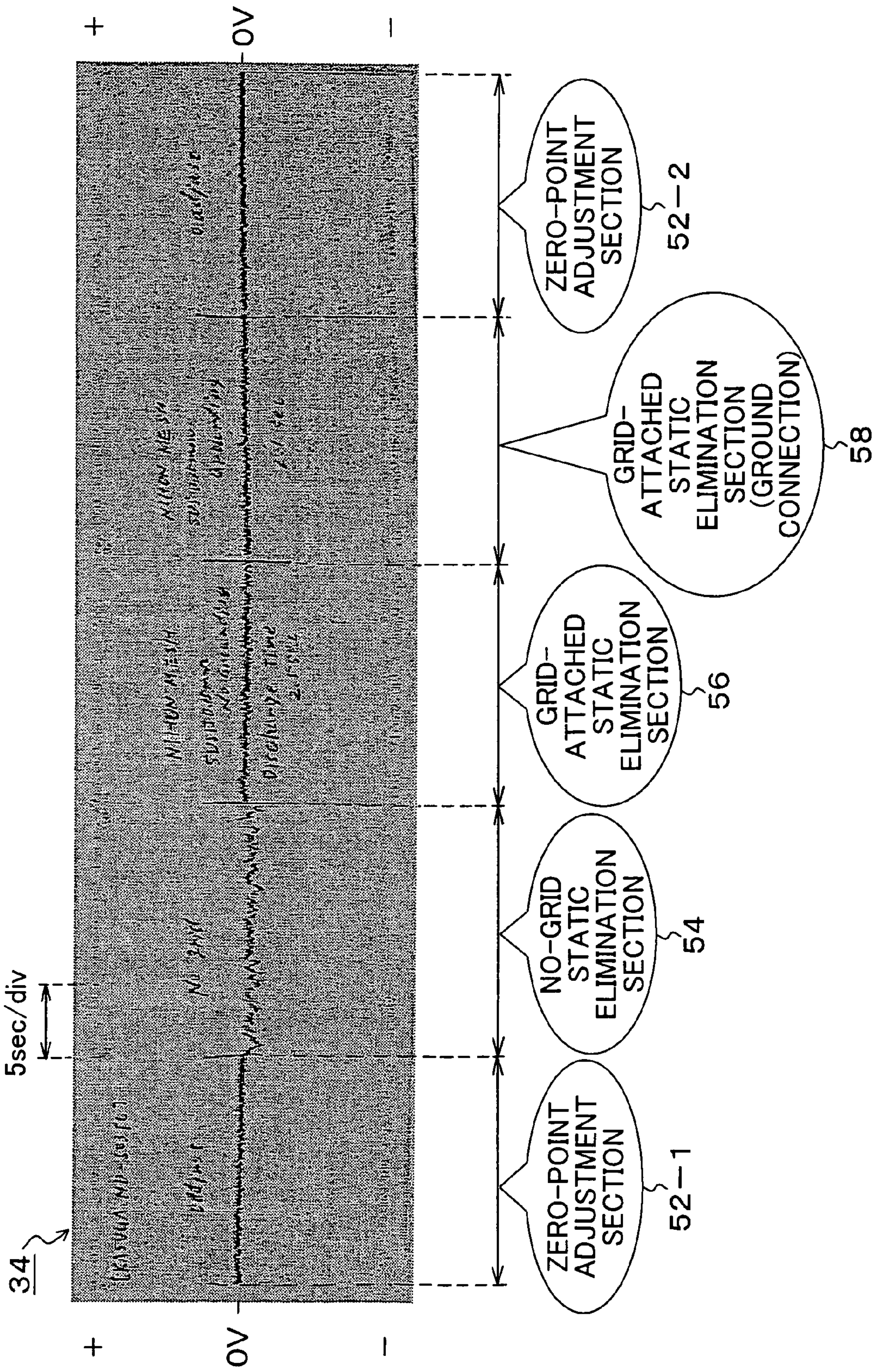
FIG. 6 is a drawing for describing recorder's recording obtained through the evaluation process of FIG. 1.

FIG. 6 depicts a record of the recording sheet paper 34 by the recorder 32 when, in the embodiment of FIG. 1, a grid using stainless steel SUS with the grid number G2 in FIG. 3 and FIG. 5 with a mesh opening M=0.15 mm and a space ratio SR=36.8% is attached to the nozzle opening of the spot-type DC ionizer 10 as shown in FIG. 1 for measurement with the charge-plate monitoring device 24 in an ion balance operation mode. The recorded waveform of the measurement plate potential on the recording paper sheet 34 of FIG. 6 was obtained by sequentially performing processes in a zero-point adjustment section 52-1, a no-grid static elimination section 54, a grid-attached static elimination section 56 without ground connection, a grid-attached static elimination section 58 with ground connection, and a zero-point adjustment section 52-2. Here, the measurement conditions are assumed to be such that a use distance L from the nozzle opening of the spot-type DC ionizer 10 to the charge plate 26 in FIG. 1 is L=5 cm, an air pressure P supplied from the air-pressure supply device 16 is P=0.1 MPa, and a time per division serving as a time resolution of the recording paper sheet is 5 sec/div. Here, to actually measure an ion balance and an ion balance variation from the recording paper sheet, an amplitude level cannot be accurately obtained with the time-axis resolution of 5 sec/div of FIG. 6. Therefore, recording has to be made with the time resolution of the recording paper sheet being sufficiently delayed, such as to 1 Hour/div, under the same measurement conditions. The following measurement values are obtained from the recording results with 1 Hour/div. The first zero-point adjustment section 52-1 represents the case where a ground connection of the charge plate 26 in the charge-plate monitoring device 24 is made for zero-point adjustment, and the recorded waveform at that time represents an ion balance variation of $V_{P-P}$=3.0 V centering on 0 V. The next no-grid static elimination section 54, in FIG. 1, the grid 12 is removed from the nozzle opening of the spot-type DC ionizer 10 and the ion balance is measured under the same conditions as those for the conventional ionizer. Although the value of the ion balance in the digital voltmeter is 0 V, a large ion balance variation occurs centering on 0 V on the waveform recording of the recording paper sheet 34, and the measurement value indicates an ion balance variation of $V_{P-P}$=9.0 V. Here, the ion balance variation of $V_{P-P}$=9.0 V in the no-grid static elimination section 54 includes the ion balance variation of $V_{P-P}$=3.0 V at the zero point in the zero-point adjustment section 52-1. Therefore, by subtracting this amount, a true ion balance variation $V_{P-P}$ in the no-grid static elimination section 54 is $$V_{P-P}=9.0\text{V}-3.0\text{V}=6.0\text{V}.$$

In the grid-attached static elimination section 56, as shown in FIG. 1, the grid 12 is attached to the nozzle of the spot-type DC ionizer 10. In this case, the ion balance is measured without a ground connection of the grid 12 to the ground. At the time of measurement of the ion balance in this grid-attached static elimination section 56, although the digital voltmeter of the charge-plate monitoring device 24 indicates 0 V, the recorded waveform on the recording paper sheet 34 recorded by the recorder 32 represents an ion balance variation of $V_{P-P}$=3.5 V centering on 0 V. Also in this case, a true ion balance variation is obtained by subtracting the ion balance variation in the zero-point adjustment section 52-1 as $$V_{P-P}=3.0\text{V}-3.0\text{V}=0.0\text{V}.$$

In the next grid-attached static elimination section 58 in which, the ion balance is measured with a ground connection of the grid 12 to the ground, although the digital voltmeter of the charge-plate monitoring device 24 indicates 0 V, the recorded waveform on the recording paper sheet 34 recorded by the recorder 32 represents an ion balance variation of $V_{P-P}$=3.0 V centering on 0 V. A true ion balance variation is obtained by subtracting the ion balance variation in the zero-point adjustment section 52-1 as $$VP\text{-}P=3.5\text{V}-3.0\text{V}=0.5\text{V}.$$

In this case, with the ground connection of the grid 12, it is observed that the ion balance variation is improved. However, for other grids, it is often the case that an influence of the ground connection is not observed. In this manner, with the grid 12 being attached to the nozzle opening of the spot-type DC ionizer 10, in contrast to the ion balance variation of $V_{P-P}$=3.0 V, a decrease to $V_{P-P}$=0.5 V or lower was able to be achieved with the attachment of the grid 12. In the present embodiment, as exemplarily shown in the ion balance measurement of the grid 12 with the grid number G2 shown in the grid lists 46-1 and 46-2 of FIG. 3 and FIG. 5, also for the remaining numbers of G1 and G3 to G11, similarly to FIG. 1, the grid 12 is attached to the nozzle opening of the spot-type DC ionizer 10. Then a determination is made as an accepted product satisfying use conditions of an ion balance of ±1.0 V, which is required in, for example, a hard disk drive manufacturing process using an ion balance as a use target and within a range of 0.1 MPa to 0.4 MPa, which is a use condition of the air pressure P. If the determination is made as an accepted product, a combination of the use distance within a range of L=5 cm to 10 cm, which is a scheduled use distance, and an appropriate air pressure P is generated and added to use conditions for the acceptance results. Here, as a material of the metal net of the grid 12 for use in the present embodiment, stainless steel SUS is used for the grid with the grid number G2 of FIG. 6. Other than this, copper Cu or copper plating or nickel Ni or nickel plating may be used.

Figure 7A:
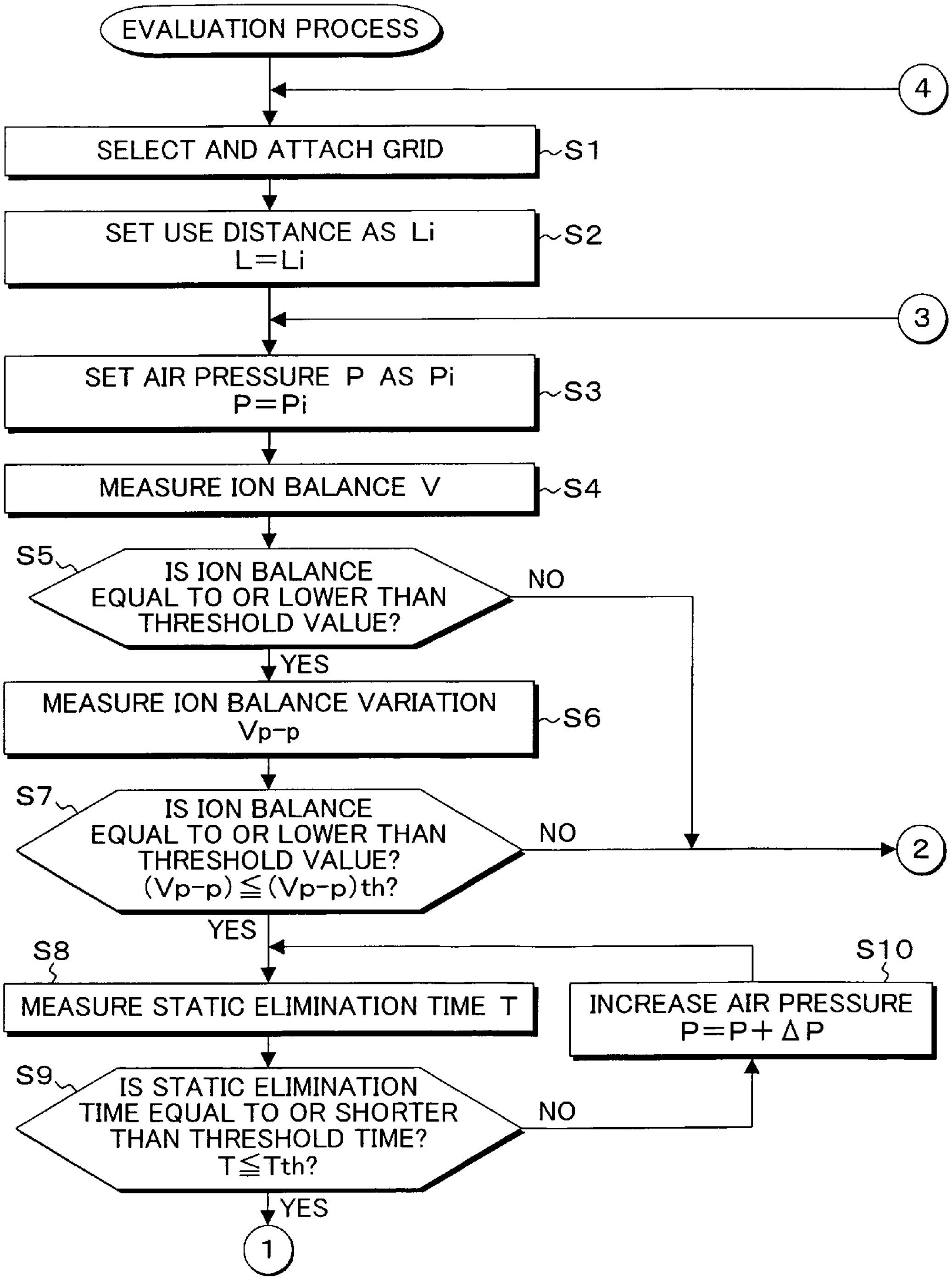
FIGS. 7A and 7B are flowcharts showing a procedure of an evaluation process according to the present invention.
Figure 7B:
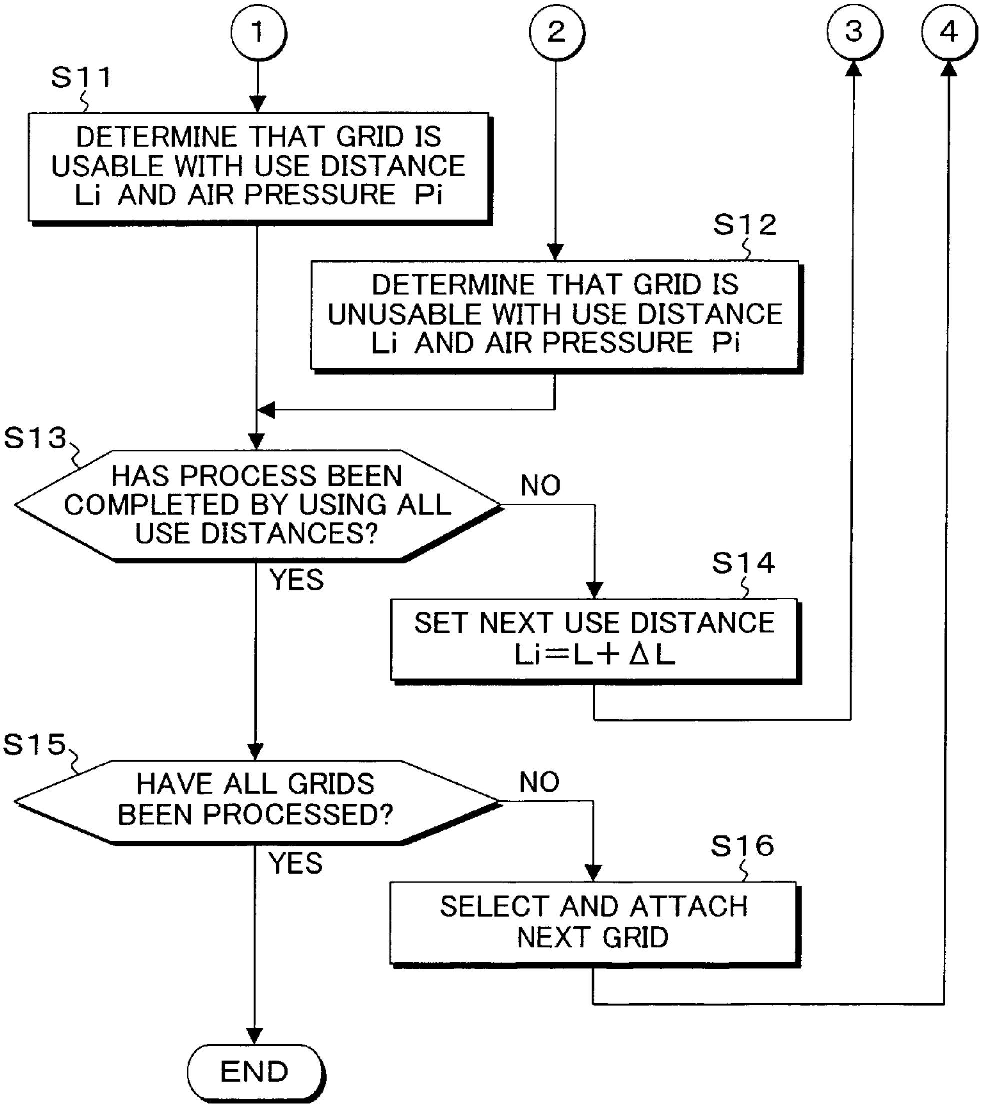

FIGS. 7A and 7B are flowcharts showing a procedure of a spot-type DC ionizer evaluation process according to the present embodiment. The evaluation process of FIGS. 7A and 7B are described with reference to FIG. 1 as follows. First, for the evaluation process, the grids 12 with the grid numbers G1 to G11 having different parameters as shown in the grid list 46-1 of FIG. 3, for example, are prepared. In step S1, one of the grids is selected, and is then attached to the nozzle opening of the spot-type DC ionizer 10 as shown in FIG. 1. Then in step S2, the use distance L between the spot-type DC ionizer 10 and the charge plate 26 is set at a specific specification distance Li defined within a range of 5.0 to 10.0 cm scheduled as a use distance in a clean room in an actual hard disk drive manufacturing process. In the present embodiment, as use distances Li, three use distances are prepared: L1=5.0 cm, L2=7.5 cm, and L3=10.0 cm. As a matter of course, the use distances Li may be set at further shorter distance intervals. Then in step S3, the air pressure P is set at an arbitrary air pressure Pi. A range of the air pressure P for use in the present embodiment is assumed to be a range from 0.1 MPa to 0.4 MPa. In step S3, the air pressure is set at the smallest air pressure Pi=0.1 MPa. Then in step S4, an ion balance V is measured. First, the charge-plate monitoring device 24 is powered on to be in an operating state, and an ion balance is then measured. In measuring the ion balance, after a zero-point adjustment in which the potential of the measurement plate 28 is set at 0 V with the charge plate 26 being connected to the ground by the charge-plate monitoring device 24, the spot-type DC ionizer 10 is operated, and ion air is blown onto the measurement plate 28. At this time, the voltage indicated on the digital voltmeter of the charge-plate monitoring device 24 is read, and is taken as a measurement value V of the ion balance. Next in step S5, it is checked whether the measured ion balance measurement value V is equal to or lower than a predetermined threshold value Vth. As this threshold value Vth, for example, it is assumed that Vth=±1 V. If the indication of the digital voltmeter of the charge-plate monitoring device 24 is within ±1 V, it is determined that the ion balance is appropriate, and then the procedure goes to step S6. On the other hand, if the ion balance indicates in step S5 a voltage exceeding Vth=±1 V, the grid 12 currently in use is inappropriate. Therefore, the procedure goes to step S12, where a determination is made as failed, that is, the currently-attached grid 12 is unusable with the currently-set use distance Li and air pressure Pi. If the ion balance is equal to or lower than the threshold value in step S5 and a determination is made as accepted, the procedure goes to step S6, where the ion balance variation $V_{P-P}$ is measured. In the measurement of the ion balance variation $V_{P-P}$, since the voltage waveform of the measurement plate 28 output from the charge-plate monitoring device 24 is recorded by the recorder 32 on the measurement values of the ion balance V in step S4, the ion balance variation $V_{P-}$ is measured from the recorded waveform on the recording paper sheet 34 of the recorder 32. Specifically, on the recording paper sheet 34 of the recorder 32, as shown in FIG. 6, subsequently to the zero-point adjustment section 52-1, for example, a waveform in the grid-attached static elimination section 56 without a grid ground connection is recorded. Thus, an ion balance variation $(V_{P-P})_0$ in the zero-point adjustment section 52-1 and an ion balance variation $(V_{P-P})_S$ in the grid-attached static elimination section 56 are calculated and, as a true ion balance variation $V_{P-P}$, an ion balance variation $V_{P-P}$ calibrated as $$V_{P-P}=(V_{P-P})_S-(V_{P-P})_0$$

is calculated. However, the time resolution of the recording paper sheet is assumed to be 1 Hour/div. Then in step S7, it is determined whether the calibrated ion balance variation is equal to or lower than a threshold value $(V_{P-P})$th. Here, the threshold value $(V_{P-P})$th of the ion balance variation is set at $(V_{P-P})$th=2.0 Vp-p, which is required in, for example, a hard disk drive manufacturing process. In step S7, if the ion balance variation is equal to or lower than the threshold value, this grid is determined as an accepted product, and the procedure goes to the next step S8. On the other hand, if the ion balance variation exceeds the threshold value, the currently-attached grid is inappropriate. Therefore, the procedure goes to step S12, where a determination is made as failed, that is, this grid 12 is unusable with the currently-set use distance Li and air pressure Pi. If the ion balance variation is equal to or lower than the threshold value in step S7, the procedure goes to step S8, where a static, elimination time T is measured. The static elimination time T can be measured by setting the charge-plate monitoring device 24 of FIG. 1 in a static elimination time measuring mode. In this static elimination time measuring mode, the charge-plate monitoring device 24 charges the voltage of the measurement plate 28 from an internal high-voltage power supply to, for example, +1000 V. In this charging state, the spot-type DC ionizer 10 is operated to blow ion air onto the measurement plate 28. Upon reception of this ion air, the voltage of the measurement plate 28 is started to be attenuated. Thus, a time taken until the plate voltage is attenuated to 5 V is measured as the static elimination time T, and then the measurement result is displayed. If the static elimination time T was able to be measured in step S8, it is checked in step S9 whether the static elimination time is equal to or shorter than a threshold time Tth. As the threshold time Tth, for example, Tth=5 seconds is set. If the static elimination time T is equal to or shorter than the threshold time Tth in step S9, for the currently-attached grid, the conditions of the ion balance V, the ion balance variation $V_{P-P}$, and the static elimination time T with the set threshold values are all satisfied, and therefore the grid is determined as an accepted product. In step S11, the acceptance result is generated with a combination of the use distance Li and the air pressure Pi being taken as a use condition, thereby determining the grid as an accepted product. On the other hand, if the static elimination time T is longer than the threshold time Tth in step S9, the current air pressure is increased in step S10 by a predetermined value ΔP, and then the static elimination time T is measured again in step S8. This is done because the reason for the static elimination time not being equal or shorter than the threshold time comes from the fact that the degree of the ion air blown onto the charge plate 26 is low, that is, the amount of plus and minus ions is small, and thus can be determined as a shortage of an air pressure. By increasing the air pressure, the static elimination time T is shortened. After increasing the air pressure in step S10, the static elimination time is measured. In step S9, it is determined again whether the static elimination time is equal to or shorter than the threshold value. If it is equal to or shorter than the threshold time, the grid is determined in step S11 as an accepted product with a combination of the use distance Li and the increased air pressure Pi at that time as a use condition. In a repeated cycle of the static elimination time measurement process with an increased air pressure in steps S9, S10, and S8, if the static elimination time is not equal to or shorter than the threshold time even with the air pressure P becoming 0.4 MPa, which is an upper limit, the grid is accepted in terms of the ion balance V and the ion balance variation $V_{P-P}$, but is failed in terms of the static elimination time T. In this case, an evaluation in which the grid satisfies part of the use condition and is intermediate between an accepted product and a failed product is determined, that is, a determination result as a provisionally-accepted product is made. Here, such an evaluation of satisfying part of the use condition is omitted in the flowchart of FIGS. 7A and 7B. After a determination of the evaluation result in step S11 as an accepted product or a determination of the evaluation result in step S12 as a failed product is completed, it is checked in step S13 whether the process has been completed by using all use distances. If not completed, in step S14, if a minimum Li=5.0 cm for example, the next use distance Li=7.5 cm is set by adding ΔL=2.5 cm. Then the procedure again returns to step S3, repeating a similar evaluation process. As a result, the evaluation results of whether the grid is an accepted product or a failed product can be obtained for three use distances L1=5.0 cm, L2=7.5 cm, and L3=10.0 cm per one grid. In the evaluation result for an accepted product, a combination of the use distance and the optimum air pressure is included as a use condition. If the process has been completed in step S13 for the currently-attached grid by using all use distances, the procedure goes to step S15, where it is checked whether all grids have been processed. If not processed, the next grid is selected in the next step S16 and is attached to the spot-type DC ionizer, and then the procedure is repeated from step S1.

FIG. 8 depicts an evaluation result list 48 obtained by performing the evaluation process of FIGS. 7A and 7B for the grids with the grid numbers G1 to G11 shown in the grid list 46-1 of FIG. 3. In the evaluation result list 48, evaluations are made with the use distance L being set at three stages, that is, 5.0 cm, 7.5 cm, and 10.0 cm. Also for the air pressure P, evaluations are made with four stages, that is, 0.1 MPa, 0.2 MPa, 0.3 MPa, and 0.4 MPa. For such use distances and air pressures, in the grid numbers G1 to G11, a circle mark represents an accepted product satisfying three evaluation conditions of the ion balance V, the ion balance variation $V_{P-P}$, and the static elimination time T. A cross mark represents a failed product not satisfying either one or both of the evaluation conditions of the ion balance V and the ion balance variation $V_{P-P}$. Furthermore, a triangle mark represents a provisionally-accepted product satisfying part of the evaluation conditions, that is, satisfying the evaluation conditions of the ion balance V and the ion balance variation $V_{P-P}$ but not satisfying the evaluation condition of the static elimination time T. When a distribution of the accepted products, the provisionally-accepted products, and the failed products in the evaluation result list of FIG. 8 is viewed, the grids G9 to G11 with large mesh openings M of 3.03 mm, 4.08 mm, and 4.95 mm, respectively, are determined as failed products or provisionally-accepted products. On the other hand, as for the grids number G1 to G3 with small mesh openings M of 0.10 mm, 0.15 mm, and 0.20 mm, respectively, if the use distance L is short, they are hardly determined as failed products. If the use distance is longer, however, sufficient ion air cannot be blown with the small mesh opening M, and therefore they are determined as failed products or provisionally-accepted products with a low air pressure P of a 0.1 MPa side. FIG. 9 depicts a measurement result list 50 of the ion balance variation and the discharge time with the grid being attached to the spot-type DC ionizer 10 as shown in FIG. 1. Here, as a use condition in the measurement result list 50, it is assumed that the use distance L=5.0 cm and the air pressure P=0.1 MPa.

In FIG. 9, the measurement result list 50 takes eleven types of grids of case numbers A to K as an example. Grids with the case numbers A, B, and C have the same mesh opening of M=0.15 mm, but their materials are different as copper CU, nickel Ni, and stainless steel SUS, respectively. For each of the grids with the case numbers A to C of different materials, the ion balance variation $V_{P-P}$ and the static elimination time T are measured in the case without ground connection and in the case with ground connection. For the ion balance variation $V_{P-P}$, for copper Cu and nickel Ni in the cases A and B, irrespectively of with or without ground connection, the ion balance variation $V_{P-P}$=0.5 V. For stainless steel SUS in the case number C, the ion balance variation $V_{P-P}$ is 0.5 V without ground connection, whilst the ion balance variation $V_{P-P}$ is 0.0 V with ground connection, which is improved. On the other hand, for the static elimination time T, a shorter time is achieved with ground connection in contrast to without ground connection. Thus, an effect of reducing the static elimination time through ground connection can be observed. For the case numbers D to G, the grid mesh opening M is sequentially increased. With the increase in the grid mesh opening M, the ion balance variation $V_{P-P}$ tends to be increased, but satisfies, at maximum, $V_{P-P}$=within 2.0 V, which is a threshold value of a hard disk drive manufacturing process. On the other hand, for the static elimination time T, the time tends to be shorter as the mesh opening is increased. This is because an increase in the mesh opening M increases the amount of ion air. Furthermore, for the ion balance, it is approximately 0 V in all of the cases, satisfying the threshold condition equal to or lower than ±1.0 V, and therefore not shown in the list. As a condition for the grid attached to the spot-type DC ionizer scheduled to be used in, for example, a hard disk drive manufacturing process, it has been confirmed that the following condition can be used.

(1) Material copper Cu or copper plating; nickel Ni or nickel plating; stainless steel SUS
(2) Mesh opening M of the mesh 0.1 mm≦M≦1.27 mm
(3) Space ratio SR of the mesh 35%≦SR≦65%
(4) Ground connection of the grid may be or may not be connected to ground Also, use conditions of a spot-type DC ionizer with such a grid attached thereto include:

(1) 5 cm≦L≦10 cm
(2) Air pressure P 0.1 MPa≦P≦0.4 MPa.

Figure 10:
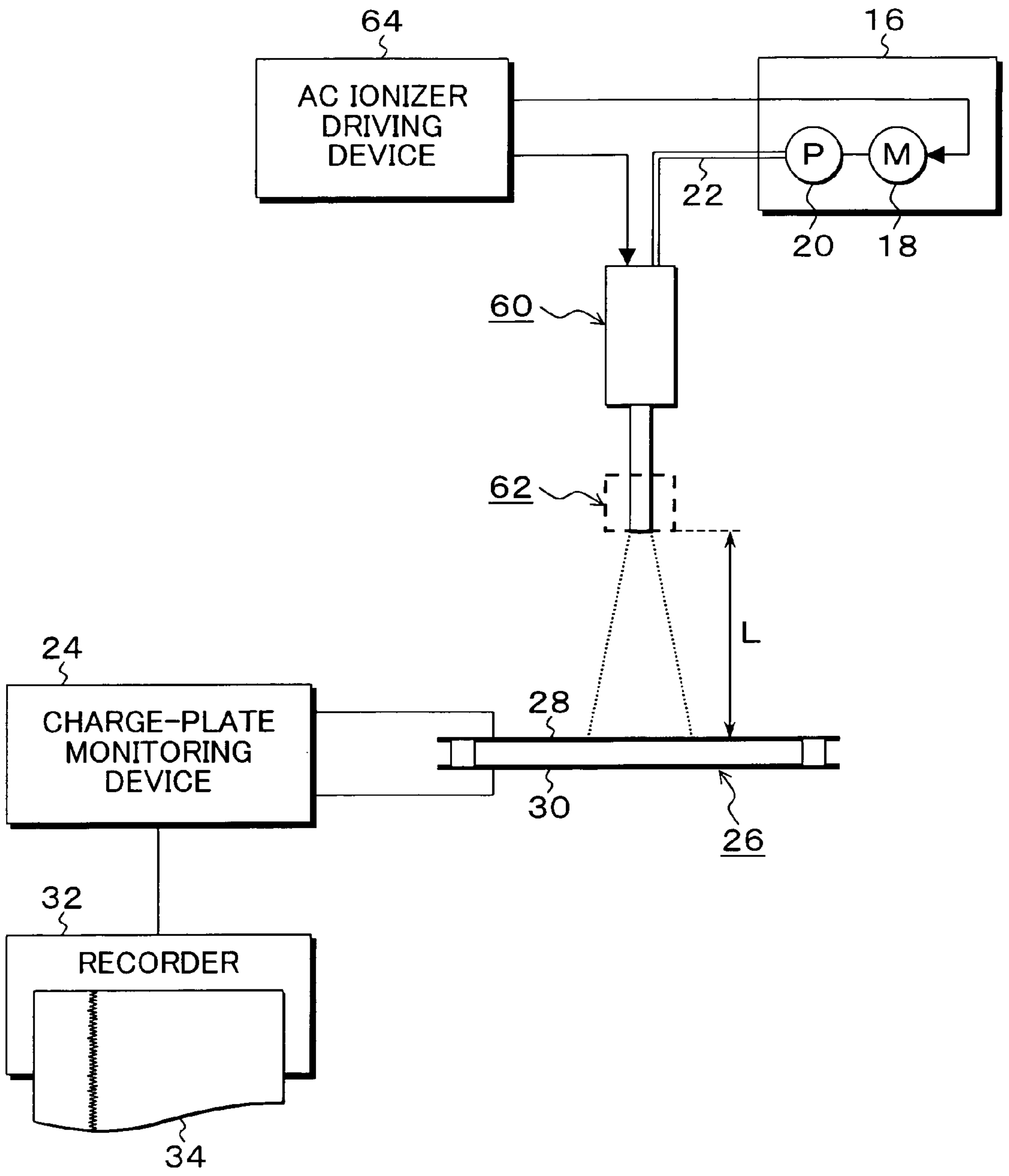
FIG. 10 is a drawing for describing the system configuration of a spot-type AC ionizer evaluation process according to the present invention.

FIG. 10 is a drawing for describing the configuration of a system for performing a spot-type AC ionizer evaluation process according to the present invention. In FIG. 10, a spot-type AC ionizer 60 is provided with an AC ionizer driving device 64 and an air-pressure supply device 16. The AC ionizer driving device 64 supplies a high-frequency alternate-current voltage of several kHz as a driving voltage to the spot-type AC ionizer 60, alternately generating plus ions and minus ions through corona discharge. The plus ions and minus ions generated in this ionizer are discharged as ion air with the assistance of compressed air supplied via an air tube 22 from the air-pressure supply device 16. Here, as the air-pressure supply device 16, as with the embodiment of FIG. 1, compressed air from an air tube provided in advance to a facility, such as a clean room, can be used. The charge-plate monitoring device 24 connecting the charge plate 26 and the recorder 32 are identical to those in the embodiment of FIG. 1. The spot-type AC ionizer 60 is placed so as to be separated a use distance L apart from the charge plate 26 at the time of an evaluation process, and has a nozzle opening portion to which a grid 62 using a metal net is attached. As the spot-type AC ionizer 60 for use in the present embodiment, "DTRY-LCE" manufactured by KOGANEI Corporation is used, for example.

Figure 11:
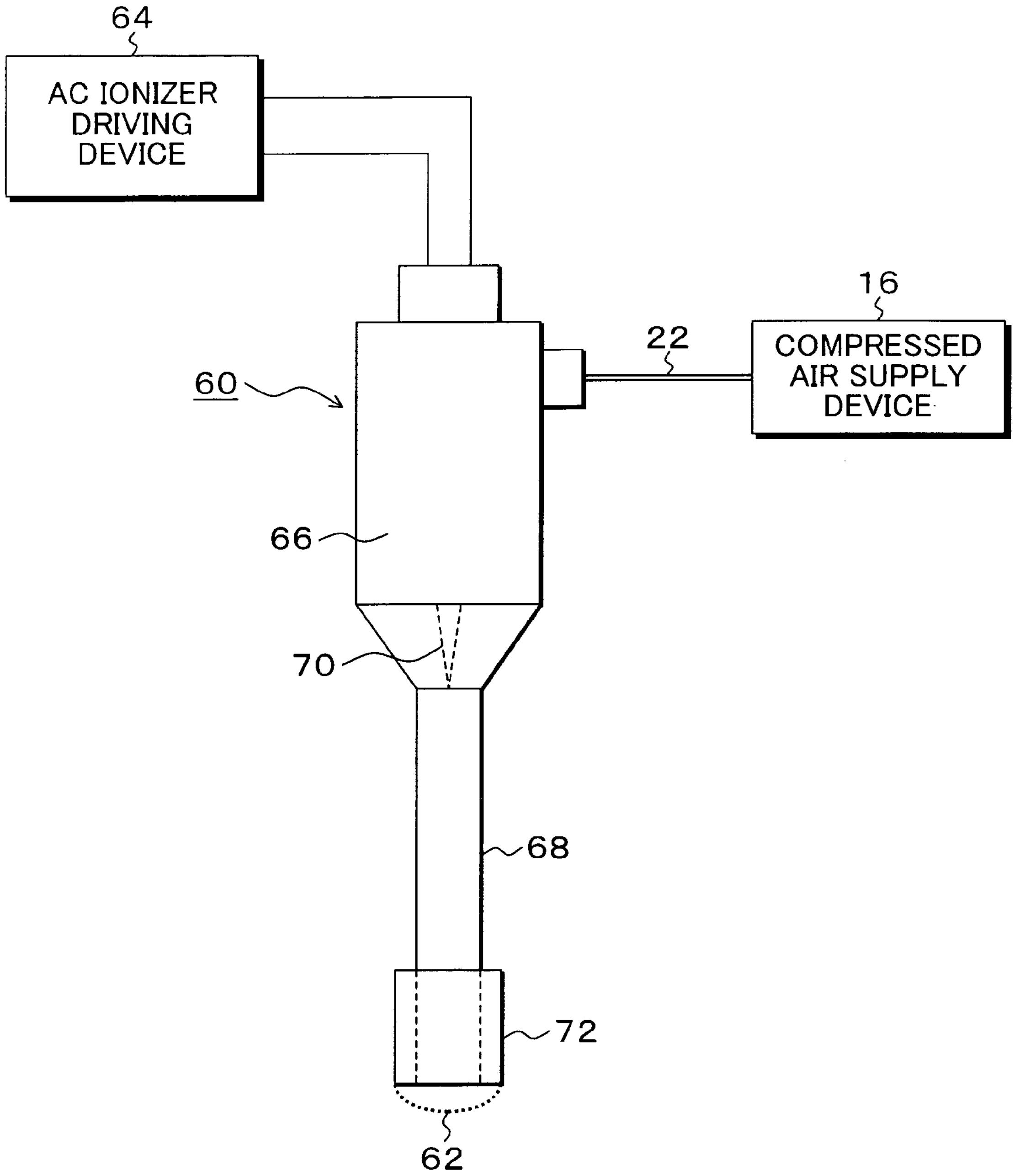
FIG. 11 is a descriptive drawing that specifically depicts a spot-type AC ionizer of FIG. 10.

FIG. 11 specifically depicts the spot-type AC ionizer 60 of FIG. 10. The spot-type AC ionizer 60 is configured of a body 66 and a nozzle 68. To the body 66, the AC ionizer driving device 64 is connected by signal lines, and the air-pressure supply device 16 is further connected via the air tube 22. The body 66 has an exit side having incorporated therein a discharge needle 70 for corona discharge with an application of an alternate-current voltage of several kHz from the AC ionizer driving device 64, thereby alternately generating plus and minus ions. The plus and minus ions generated in the body 66 are discharged as ion air through the nozzle 68 to the outside with an air pressure from the air-pressure supply device 16. At the tip of the nozzle 68, a grid adaptor 72 is attached. The grid adaptor 72 has attached at its opening side the grid 62 using a metal net. As the grid 62 for use as being attachable to or detachable from the grid adaptor 72 in the spot-type AC ionizer 60, those identical to the grids 12 for use in the spot-type DC ionizer 10 of FIG. 1 can be used. For example, the grids with the grids numbers G1 to G11 in the grid list 46-1 shown in FIG. 3 can be used.

Figure 12A:
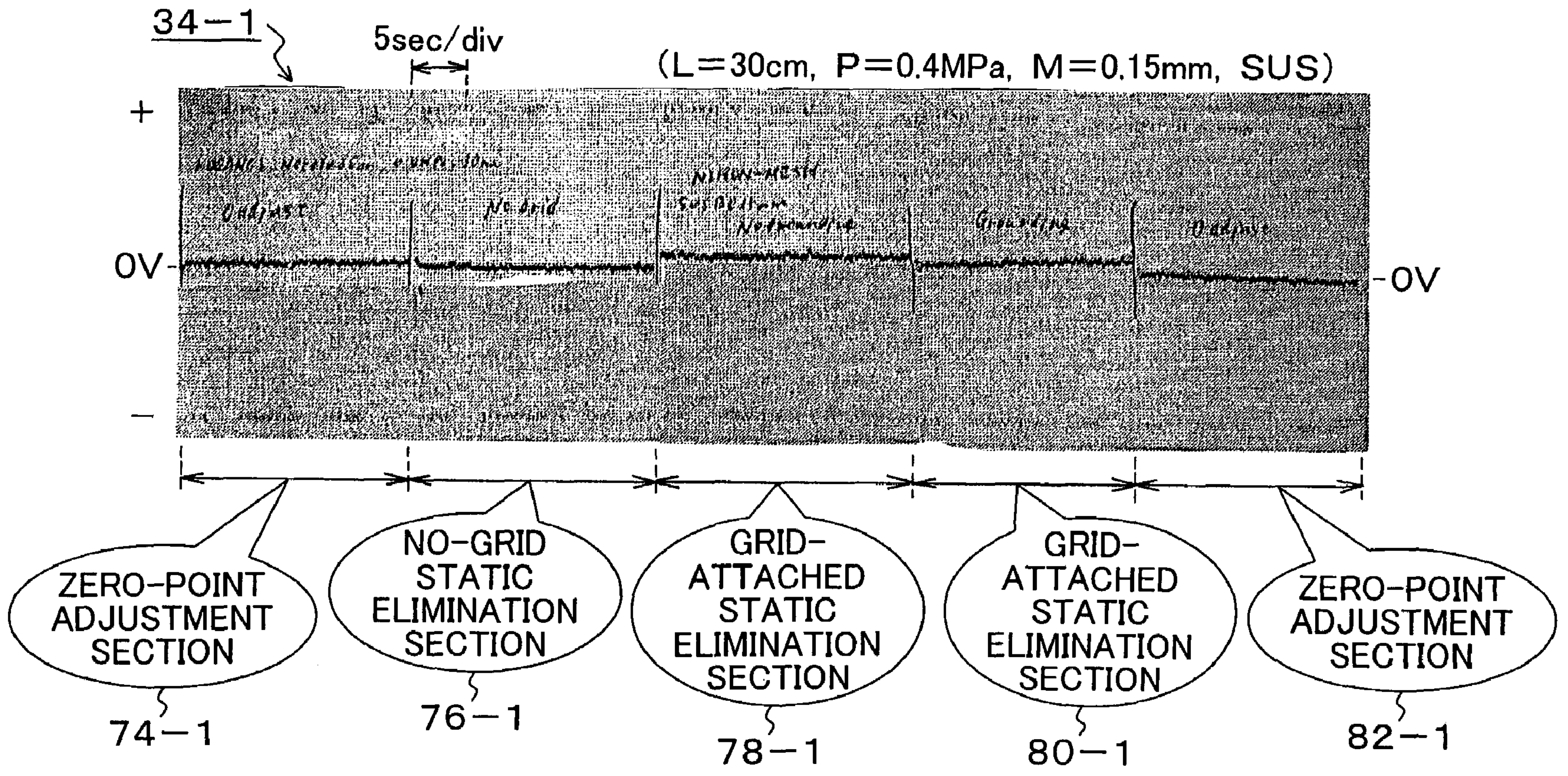
FIGS. 12A and 12B are drawings for describing recorder's recordings obtained through an evaluation process of FIG. 10.
Figure 12B:
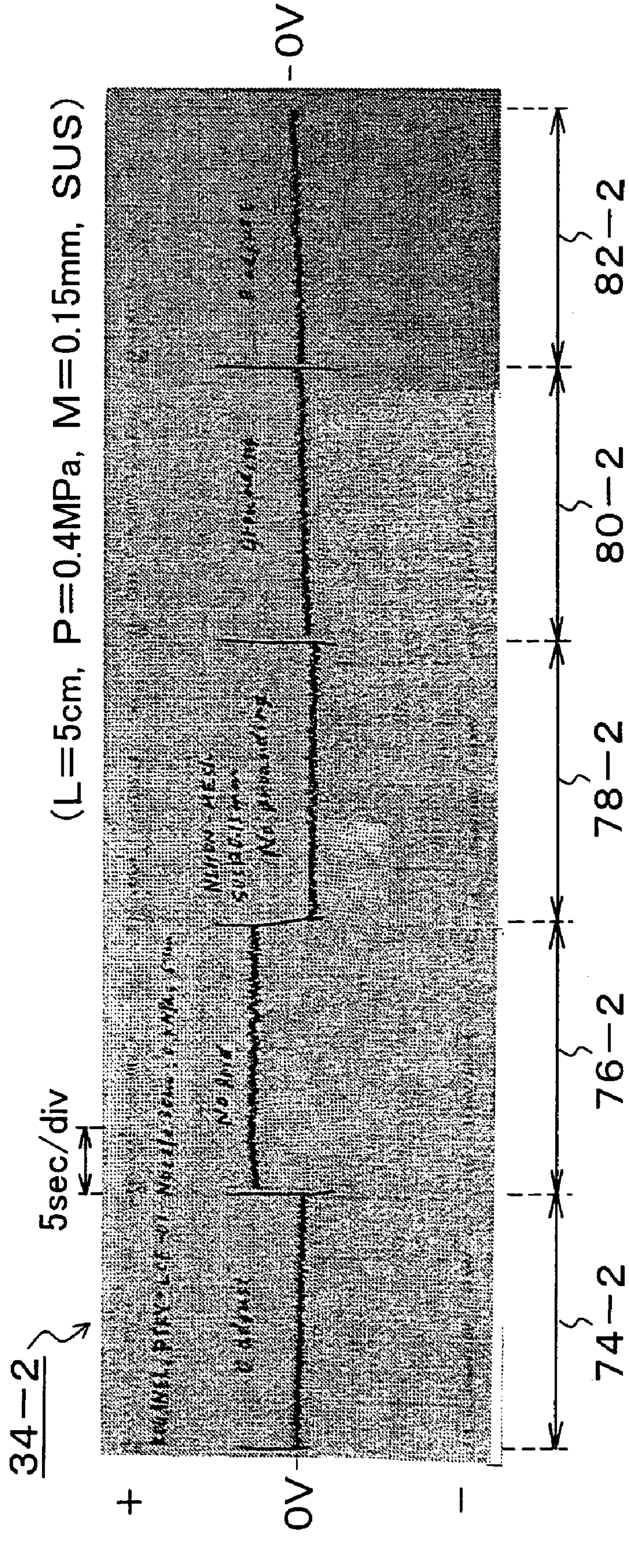

FIGS. 12A and 12B are drawings for describing recorded waveform obtained by the recorder 32 through a measurement process of the spot-type AC ionizer 60 of FIG. 10 in an ion balance operation mode. Here, a recording record waveform is shown with a time per division serving as a time resolution of the recording paper sheet is 5 sec/div. To accurately obtain an amplitude level, recording has to be made with the time resolution of the recording paper sheet being sufficiently delayed, such as to 1 Hour/div, under the same measurement conditions. The following measurement values are obtained from the recording results with the time resolution of 1 Hour/div.

FIG. 12A depicts a recorded waveform of a recording paper sheet 34-1 when the use distance L of the spot-type AC ionizer 60 is set as L=30 cm, whilst FIG. 12B depicts a recorded waveform of a recording paper sheet 34-2 when the use distance L is set as L=5 cm. Also, an air pressure P of the spot-type AC ionizer 60 when obtaining the waveform recordings of FIGS. 12A and 12B is P=0.4 MPa. The recorded waveform on the recording paper sheet 34-1 in FIG. 12A are recorded as being divided into a zero-point adjustment section 74-1, a no-grid static elimination section 76-1, a grid-attached static elimination section 78-1 without ground connection, a grid-attached static elimination section 80-1 with ground connection, and a zero-point adjustment section 82-1. This is similar to the recorded waveform on the recording paper sheet 34-2 in FIG. 12B, where it is divided into a zero-point adjustment section 74-2, a no-grid static elimination section 76-2, a grid-attached static elimination section 78-2 without ground connection, a grid-attached static elimination section 80-2 with ground connection, and a zero-point adjustment section 82-2. First, for the recorded waveform in the ion balance measurement mode when the use distance L is L=30 cm of FIG. 12A, which is considerably long in contrast to the use distance L=5 to 10 cm for use in the present embodiment, in the zero-point adjustment section 74-1 with the charge plate 26 is connected to the ground to set the measurement plate 28 at 0 V, the recorded waveform has the ion balance variation $V_{P-P}$=3.0 V centering on 0 V. In the next no-grid static elimination section 76-1, the ion balance is measured with the grid 62 being removed, and the recorded waveform becomes the recorded waveform of the conventional spot-type AC ionizer without using the grid 62. In this case, since the use distance is sufficiently away as L=30 cm, the ion balance indicates zero V at a digital voltmeter of the charge-plate monitoring device 24. Also for the ion balance variation $V_{P-P}$, when calibrated with an initial value in the zero-point adjustment section, $V_{P-P}$=0.0 V, which falls within a satisfactory value. From the above, it can be seen that, if the use distance is sufficiently away even without provision of the grid 62, the ion balance variation can be suppressed to an appropriate value. However, in the case of the discharge distance L=30 cm of FIG. 12A, which is distant, 1000 V is not decreased to 5 V with the air pressure at this time P=0.4 MPa even as the measurement time of the static elimination time T passes by, thereby causing T=0. With the air pressure as it is, the capability of the ionizer cannot be achieved. Therefore, in the case of L=30 cm, a use scheme has to be such that the air pressure P is extremely increased so as to make the static elimination time T sufficiently short. This poses a problem for the conventional AC ionizer. In the next grid-attached static elimination section 78-1 with the grid being attached but without ground connection of the grid, there is a problem in which the ion balance V is shifted to a plus side and the ion balance V does not become 0 V. In the next grid-attached static elimination section 80-1 with ground connection of the grid, an offset of the ion balance V disappears, and the ion balance V is approximately stable at V=0.

FIG. 12B depicts a use example within a range of L=5 cm to 10 cm, which is the use distance in the present embodiment, where L=5 cm. In the zero-point adjustment section 74-2 in this case, the ion balance variation $V_{P-P}$=3 V centering on 0 V, and this ion balance variation $V_{P-P}$ at the time of zero-point adjustment is used to be removed for calibration from the actual ion balance measurement value. In the no-grid static elimination section 76-2, it can be seen that the ion balance V is significantly shifted to a plus side due to the grid not being attached. This is the measurement result that supports the fact that the ion balance of the conventional AC ionizer is increased with the use distance L=5 cm. By contrast, when a grid without ground connection is attached, as in the grid-attached static elimination section 78-2, the ion balance becomes 0 V only with the attachment of the grid. Also, for the ion balance variation, an ion balance variation $(V_{P-P})_S$ read from the recorded waveform is 3.0 V, and a value obtained through calibration by subtracting therefrom 3 V, which is the ion balance variation $(V_{P-P})_0$ at the time of zero-point adjustment measured in the zero-point adjustment section 74-2, is a correct ion balance variation $V_{P-P}$. Therefore, $$V_{P-P}=(V_{P-P})_S-(V_{P-P})_0=3.0\text{V}-3.0\text{V}=0\text{V}.$$

In the grid-attached static elimination section 80-2, the ion balance is slightly offset to a plus side with respect to 0 V, according to the recorded waveform, but the digital voltmeter of the device body indicates 0 V. Similarly, only with attachment of the grid, the ion balance is decreased to approximately 0 V. Here, the ion balance variation is also $V_{P-P}$=0 V. It can be confirmed that, irrespectively of with or without ground connection of the grid, the ion balance variation is also $V_{P-P}$ is almost exactly 0 V. The procedure of the evaluation process in the present embodiment in the spot-type AC ionizer 60 of FIG. 10 is performed in the exactly the same manner as that of the spot-type DC ionizer 10 shown in FIGS. 7A and 7B. In the evaluation process according to the procedure of FIGS. 7A and 7B, points unique to the spot-type AC ionizer 60 include a point where, since the ion balance variation is approximately 0 V irrespectively of the presence or absence of a grid, the evaluation result obtained by comparison between the measurement of the ion balance variation and the threshold value in steps S6 and S7 always indicates acceptance. Therefore, in the case of the spot-type AC ionizer, acceptance may be initially determined for the ion balance variation, and the processes in steps S6 and S7 may be skipped. In the spot-type AC ionizer evaluation process, the ion balance is measured in step S4. If it is determined in step S5 as equal to or lower than the threshold value and therefore accepted, in steps S8 to S10, the static elimination time T is measured with the use distance Li and the air pressured P currently set to be determined as being equal to or shorter than the threshold time. If the static elimination time is longer than the threshold time, the air pressure P is increased, and an air pressure with the static elimination time being equal to or shorter than the threshold time is determined as an optimum air pressure. As a result, in the case of the spot-type AC ionizer 60, it has been confirmed that the evaluation results obtained through the evaluation process of FIGS. 7A and 7B are such that almost all grids are determined as accepted products for the evaluation condition of the ion balance V and the ion balance variation $V_{P-P}$, but grids with a low air pressure P and a small mesh opening may be determined as provisionally-accepted products due to the static elimination time T not being equal to or smaller than the threshold value. Therefore, it can be seen that, from among the accepted products obtained through the evaluation process of FIGS. 7A and 7B, some are given priority based on a condition of a short static elimination time T, and the one with a high priority can be selected as an optimum grid for use.

FIGS. 13A to 13E are drawings for describing measurement result lists when a measurement is performed in an ion balance measurement mode with a grid being attached to the spot-type AC ionizer 60 of FIG. 10. As measurement conditions in measurement result lists 84-1 to 84-5 of FIGS. 13 A to 13C and FIGS. 14D to 13E, a case number A corresponds to a conventional product without a grid. In case numbers B to H, a grid is attached, and its mesh opening M is sequentially increased for use. Also, as measurement conditions, the use distance L is L=5.0 cm, the material of the grid is stainless steel SUS, and furthermore the grid is connected to the ground. Still further, the measurement result lists 84-1 to 84-4 depict the case where the air pressure P is increased as P=0.1 MPa, 0.2 MPa, 0.3 MPa, and 0.4 MPa. Also, the measurement result list 84-5 of FIG. 14E depicts the measurement results without ground connection of the grid under the same condition of the air pressure P=0.4 MPa in the measurement result list 84-4 of FIG. 14D. First, when the measurement result list 84-1 of FIG. 13A is viewed, this is the case where the air pressure P is the lowest, that is, 0.1 MPa. At this time, in the case number A without a grid corresponding to the conventional product, the ion balance V is significantly shifted to 17 V, the ion balance variation $V_{P-P}$ is 0 V, the static elimination time T is infinite, and the product is not usable. Next, as in the case number B, when a grid with a fine mesh opening M=0.15 mm is attached, the ion balance is decreased to 4 V, but still exceeds 1 V. Also, the static elimination time T exceeds the threshold time of 5 seconds to 12.6 seconds. Therefore, this is a failed product. For the case numbers C to F, the ion balance V exceeds 1 V, the ion balance variation $V_{P-P}$ is 0 V, but the static elimination time is relatively long, on the order of 8 to 9 seconds. Therefore, these are failed products. For the remaining case numbers G and H, the ion balance V falls within a value equal to or lower than 1V, the ion balance variation $V_{P-P}$ is 0 V, but the static elimination time is relatively long, on the order of 8 to 9 seconds. Therefore, these can be appropriate as provisionally-accepted products. Also, in the measurement result list 84-2 of FIG. 13B, with the air pressure P being increased to 0.2 MPa, the ion balance V is slightly improved to 1 to 3 V. The static elimination time T is reduced approximately by half of the time in the case of the measurement result 84-1 and is lower than the threshold time of 5 seconds. Therefore, this can be said as a provisionally-accepted product. Also, in the measurement result list 84-3 of FIG. 13C, with the air pressure P being further increased to 0.3 MPa, the ion balance V is improved. The static elimination time T is reduced to approximately 3 seconds. The case numbers B to D and G are provisionally-accepted products, whilst the case numbers E, F, and H are accepted products. Also, in the measurement result list 84-4 of FIG. 14D, with the air pressure P being increased to 0.4 MPa, the ion balance V is improved. The static elimination time T is also improved within a range of 1.9 to 2.3 seconds. Strictly speaking, the case numbers B, D, F, and H are provisionally-accepted products, whilst the case numbers C, E, and G are accepted products. In practice, however, all cases can be handled as accepted products. Furthermore, in the measurement result list 84-5 of FIG. 14E without ground connection of a grid, compared with the measurement result list 84-4 with ground connection, the ion balance V is almost the same, the static elimination time T is slightly increased to 2.0 to 2.5 seconds, but there is not much difference. Also in this case, strictly speaking, the case numbers C and E are provisionally-accepted products, whilst the case numbers B, D, and F to H are accepted products. In practice, however, all cases can be handled as accepted products. From the measurement result lists of FIGS. 13 and 14, as the spot-type AC ionizer 60, it can be seen that a desirable use condition of the air pressure P is P=0.4 MPa. As a matter of course, also for the air pressure P=0.1 to 0.3 MPa, grids with the ion balance V satisfying a condition within ±1 V, which is required in a hard disk drive manufacturing process can be used as accepted products. In practical use, as conditions of the grid for use in the spot-type AC ionizer 60, the conditions (1) to (3) set for the spot-type DC ionizer 10 can be applied. Also as use conditions, (1) and (2) set for the spot-type DC ionizer 10 can be applied. However, as for the air pressure P, the static elimination time is too long with 0.1 MPa, and therefore a use condition of 0.2 to 0.4 MPa is desirable. Here, in the above-described embodiments, a grid with one metal net being placed at the nozzle opening portion is attached, but a double grid with two metal nets being overlaid may be used. Also, a determination as to whether the grid attached to the ionizer for use is acceptable cannot be uniquely defined depending on the type of the spot-type ionizer for use. Therefore, for each ionizer, it is required to perform the evaluation process shown in the flowchart of FIGS. 7A and 7B to determine whether it is an accepted product or failed product, and obtain, as an evaluation result, a use condition of the use distance of the grid and the air pressure obtained as those for an accepted product. Furthermore, the grid conditions and the use conditions of the ionizer with a grid attached thereto shown in the above embodiments are merely an example. Using a grid with which meshes under which use conditions is determined by applying the evaluation process shown in FIGS. 7A and 7B. Still further, the evaluation process of FIGS. 7A and 7B may be an evaluation process automatically performed by a program of a computer, instead of a manual measurement process. For this automatic evaluation process, a computer functioning as a controller is connected with an appropriate interface to the DC ionizer driving device 14 or the AC ionizer driving device 64, the air-pressure supply device 16, and the charge-plate monitoring device. 24 of the measurement system of FIG. 1 or FIG. 10, and a program corresponding to the flowcharts of FIGS. 7A and 7B is executed by the computer for automatic evaluation. Still further, the present invention includes appropriate modifications without impairing its objects and advantages, and is also not restricted by numerical values shown in the above embodiments.

What is claimed is:

1. A method of evaluating a spot-type ionizer in which a driving voltage is applied to a discharge needle for corona discharge to generate plus ions and minus ions and, with air externally supplied, ion air containing the plus ions and the minus ions generated from the discharge needle is blown in a spot manner from a nozzle opening onto a target to neutralize static electricity, the method including:

placing the spot-type ionizer above and apart from a measurement plate of a charge-plate monitoring device;

attaching a grid using a metal net to the nozzle opening of the ionizer;

setting an air pressure of the compressed air at a predetermined value and setting a use distance between the measurement plate and the nozzle opening at a predetermined distance;

operating the spot ionizer to measure by the charge-plate monitoring device an ion balance and an ion balance variation for comparison with respective threshold values, and if the ion balance and the ion balance variation are equal to or lower than the respective threshold values, making a determination as accepted, and if the ion balance and the ion balance variation are larger than the respective threshold values, making a determination as failed;

if the determination is made as accepted regarding the ion balance and the ion balance variation, with the measurement plate being charged with a predetermined start voltage by the charge-plate monitoring device, measuring a static elimination time until the predetermined start voltage is decreased to a predetermined static-elimination voltage by an operation of the ionizer;

comparing the static elimination time with a predetermined threshold time, if the static elimination time is longer than the threshold time, measuring the static elimination time while increasing the air pressure, and determining an air pressure with the static elimination time being equal to or shorter than the threshold time as an optimal air pressure with the set use distance; and generating an acceptance result for the grid with a combination of the set use distance and the optimal air pressure as a use condition.

2. The spot-type ionizer evaluation method according to claim 1, wherein the spot-type ionizer is a DC ionizer in which a direct-current voltage is applied to a pair of discharge needles for corona discharge, plus ions are generated from a plus-side discharge needle and simultaneously minus ions are generated from a minus-side discharge needle and, with a compressed air externally supplied, the ion air containing the plus ions and the minus ions generated from the discharge needles is blown from the nozzle opening onto the target to neutralize static electricity.

3. The spot-type ionizer evaluation method according to claim 1, wherein the spot-type ionizer is an AC ionizer in which an alternate-current voltage is applied to the discharge needles for corona discharge, plus ions are alternately generated from a plus-side discharge needle and, with a compressed air externally supplied, the ion air containing the plus ions and the minus ions generated from the discharge needle is blown from the nozzle opening onto the target to neutralize static electricity.

4. The spot-type ionizer evaluation method according to claim 1, wherein, as the grid, a plurality of grids with a mesh opening of meshes within a range of 0.1 mm to 1.27 mm inclusive are prepared, and the evaluation process is repeated for each grid to generate the acceptance result with the combination of the set use distance and the optimal air pressure as the use condition.

5. The spot-type ionizer evaluation method according to claim 1, wherein, as the grid, a plurality of grids with a space ratio SR of meshes within a range of 35% to 65% inclusive are prepared, and the evaluation process is repeated for each grid to generate the acceptance result with the combination of the set use distance and the optimal air pressure as the use condition.

6. The spot-type ionizer evaluation method according to claim 1, wherein a metal net made of copper CU, copper plating, nickel Ni, nickel plating, or stainless steel SUS is used for the grid.

7. The spot-type ionizer evaluation method according to claim 1, wherein the use distance of the spot-type ionizer is set within a range of 5cm to 10cm inclusive, and a determination is made as accepted if the ion balance is equal to or lower than ±1 V and the ion balance variation is equal to or lower than 2.0 Vp-p.

8. The spot-type ionizer evaluation method according to claim 1, wherein the static elimination time is measured while the air pressure of the compressed air supplied to the spot-type ionizer is changed within a range of 0.1 MPa to 0.4 MPa inclusive to determine the optimal air pressure.

9. The spot-type ionizer evaluation method according to claim 1, wherein the evaluation process is performed without a ground connection of the grid to generate the acceptance result for the grid with the combination of the set use distance and the optimal air pressure as the use condition.

10. The spot-type ionizer evaluation method according to claim 1, wherein the evaluation process is performed with a ground connection of the grid to generate the acceptance result for the grid with the combination of the set use distance and the optimal air pressure as the use condition.

11. The spot-type ionizer evaluation method according to claim 1, wherein the ion balance variation represents a value obtained by making a ground connection of the measurement plate to measure in advance a zero-adjustment value of the ion balance variation, and performing calibration by subtracting the zero-adjustment value from the ion balance variation measured with the spot-type ionizer being operated.

12. The spot-type ionizer evaluation method according to claim 1, wherein the ion balance variation is measured from a recorded waveform of a potential of the measurement plate by a recorder connected to the charge-plate monitoring device.

13. The spot-type ionizer evaluation method according to claim 1, wherein measuring the static elimination time is performed by measuring, with the measurement plate being charged with a predetermined start voltage of 1000 V by the charge-plate monitoring device, a time until the predetermined start voltage is decreased to a predetermined static-elimination voltage of 5 V by an operation of the ionizer.

14. A spot-type ionizer system in which a driving voltage is applied to discharge needles for corona discharge to generate plus ions and minus ions and, with air externally supplied, ion air containing the plus ions and the minus ions generated from the discharge needles is blown in a spot manner from a nozzle opening onto a target to neutralize static electricity, comprising:

a spot-type ionizer being placed above and apart from a measurement plate of a charge-plate monitoring device;

a grid using a metal net being attached to the nozzle opening of the ionizer;

an air pressure supply device setting an air pressure of the compressed air at a predetermined value and setting a use distance between the measurement plate and the nozzle opening at a predetermined distance;

wherein the grid has a space ratio SR of meshes within a range of 35% to 65% inclusive; and a computer operating the spot ionizer to measure by use of the charge-plate monitoring device an ion balance and an ion balance variation for comparison with respective threshold values, and if the ion balance and the ion balance variation are equal to or lower than the respective threshold values, making a determination as accepted, and if the ion balance and the ion balance variation are larger than the respective threshold values, making a determination as failed;

wherein if the determination is made as accepted regarding the ion balance and the ion balance variation, with the measurement plate being charged with a predetermined start voltage by the charge-plate monitoring device, a static elimination time is measured until the predetermined start voltage is decreased to a predetermined static-elimination voltage by an operation of the ionizer;

wherein the static elimination time is compared with a predetermined threshold time, and if the static elimination time is longer than the threshold time, the static elimination time is measured while increasing the air pressure, and an air pressure is determined with the static elimination time being equal to or shorter than the threshold time as an optimal air pressure with the set use distance; and wherein an acceptance result is generated for the grid with a combination of the set use distance and the optimal air pressure as a use condition.

15. The spot-type ionizer system according to claim 14, wherein the spot-type ionizer is a DC ionizer in which plus ions and minus ions are simultaneously generated through corona discharge by application of a direct-current voltage or an AC ionizer in which plus ions and minus ions are alternately generated through corona discharge by application of an alternate-current voltage.

16. The spot-type ionizer system according to claim 14, wherein the grid has a mesh opening of meshes within a range of 0.1 mm to 1.27 mm inclusive.

17. The spot-type ionizer system according to claim 14, wherein a metal net made of copper CU, copper plating, nickel Ni, nickel plating, or stainless steel SUS is used for the grid.

* * * * *